(12) United States Patent
Shin et al.

(10) Patent No.: US 10,424,268 B2
(45) Date of Patent: Sep. 24, 2019

(54) MOBILE TERMINAL AND CONTROLLING METHOD THEREOF

(71) Applicant: LG ELECTRONICS INC., Seoul (KR)

(72) Inventors: Woohyoung Shin, Seoul (KR); Hongjo Shim, Seoul (KR); Mihyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

(21) Appl. No.: 14/927,143

(22) Filed: Oct. 29, 2015

(65) Prior Publication Data

US 2016/0314759 A1    Oct. 27, 2016

(30) Foreign Application Priority Data

Apr. 22, 2015  (KR) .......................... 10-2015-0056398

(51) Int. Cl.
| | |
|---|---|
| *G09G 5/00* | (2006.01) |
| *H04N 5/232* | (2006.01) |
| *G06F 3/041* | (2006.01) |
| *G02B 27/01* | (2006.01) |
| *G06F 3/14* | (2006.01) |
| *G06F 3/0488* | (2013.01) |
| *G06F 3/01* | (2006.01) |
| *H04M 1/725* | (2006.01) |

(52) U.S. Cl.
CPC ........... *G09G 5/006* (2013.01); *G02B 27/017* (2013.01); *G06F 3/011* (2013.01); *G06F 3/013* (2013.01);
(Continued)

(58) Field of Classification Search
CPC ....... G06T 19/006; G06T 7/20; G06T 19/003; H04B 10/116; G02B 2027/0178;
(Continued)

(56) References Cited

U.S. PATENT DOCUMENTS

| | | | |
|---|---|---|---|
| 2011/0032200 A1* | 2/2011 | Park ...................... | G06F 3/0236 345/173 |
| 2012/0302289 A1* | 11/2012 | Kang ...................... | G06F 3/011 455/557 |

(Continued)

OTHER PUBLICATIONS

Fraser et al. "Revealing the Realities of Collaborative Virtual Reality", CVE'00, Proceedings of the third international conference on Collaborative virtual environments p. 29-37, 2000 (Year: 2000).*

(Continued)

*Primary Examiner* — Yingchun He
(74) *Attorney, Agent, or Firm* — Birch, Stewart, Kolasch & Birch, LLP

(57) ABSTRACT

A glasses type mobile terminal including an output unit configured to output information; a camera; a wireless communication unit configured to wirelessly communicate with an external terminal; and a controller configured to transmit a first image received by the camera to the external terminal via the wireless communication unit, receive touch information from the external terminal indicating a touch input of the first image displayed on the external terminal is outside a corresponding viewing range of the glasses type mobile terminal, and display an indicator via the output unit indicating the touch input of the first image displayed on the external terminal is outside the viewing region of the glasses type mobile terminal.

17 Claims, 31 Drawing Sheets

Output of glass device

Output of tablet device

(52) U.S. Cl.
CPC ............ *G06F 3/041* (2013.01); *G06F 3/0488* (2013.01); *G06F 3/1454* (2013.01); *H04M 1/7253* (2013.01); *H04N 5/23203* (2013.01); *H04N 5/23293* (2013.01); *G02B 2027/0178* (2013.01)

(58) Field of Classification Search
CPC ..... G02B 27/017; G06F 3/013; G06F 3/0488; G06F 3/011; H04M 1/7253
USPC ........................................................ 345/520
See application file for complete search history.

(56) References Cited

U.S. PATENT DOCUMENTS

| | | | |
|---|---|---|---|
| 2013/0129254 A1 | 5/2013 | Salisbury | |
| 2013/0335573 A1* | 12/2013 | Forutanpour | G06F 3/011 348/158 |
| 2014/0152531 A1* | 6/2014 | Murray | G06F 1/1632 345/8 |
| 2016/0055676 A1* | 2/2016 | Kasahara | G06T 19/006 345/633 |
| 2016/0148431 A1* | 5/2016 | Seydoux | G06T 19/006 345/633 |
| 2016/0224176 A1* | 8/2016 | Kim | G06F 3/0416 |
| 2016/0240011 A1* | 8/2016 | Fedosov | G06T 19/006 |

OTHER PUBLICATIONS

Gauglitz et al., "Integrating the Physical Environment into Mobile Remote Collaboration," Proceedings of the 14th International Conference on Human-computer Interaction with Mobile Devices and Services, MOBILEHCI '12, New York, USA, Jan. 1, 2012, 10 pages, XP055177228.

Statt, "Microsoft's HoloLens Explained: How it Works and Why It's Different," CNET, Jan. 24, 2015, pp. 1-5, XP055289839.

* cited by examiner

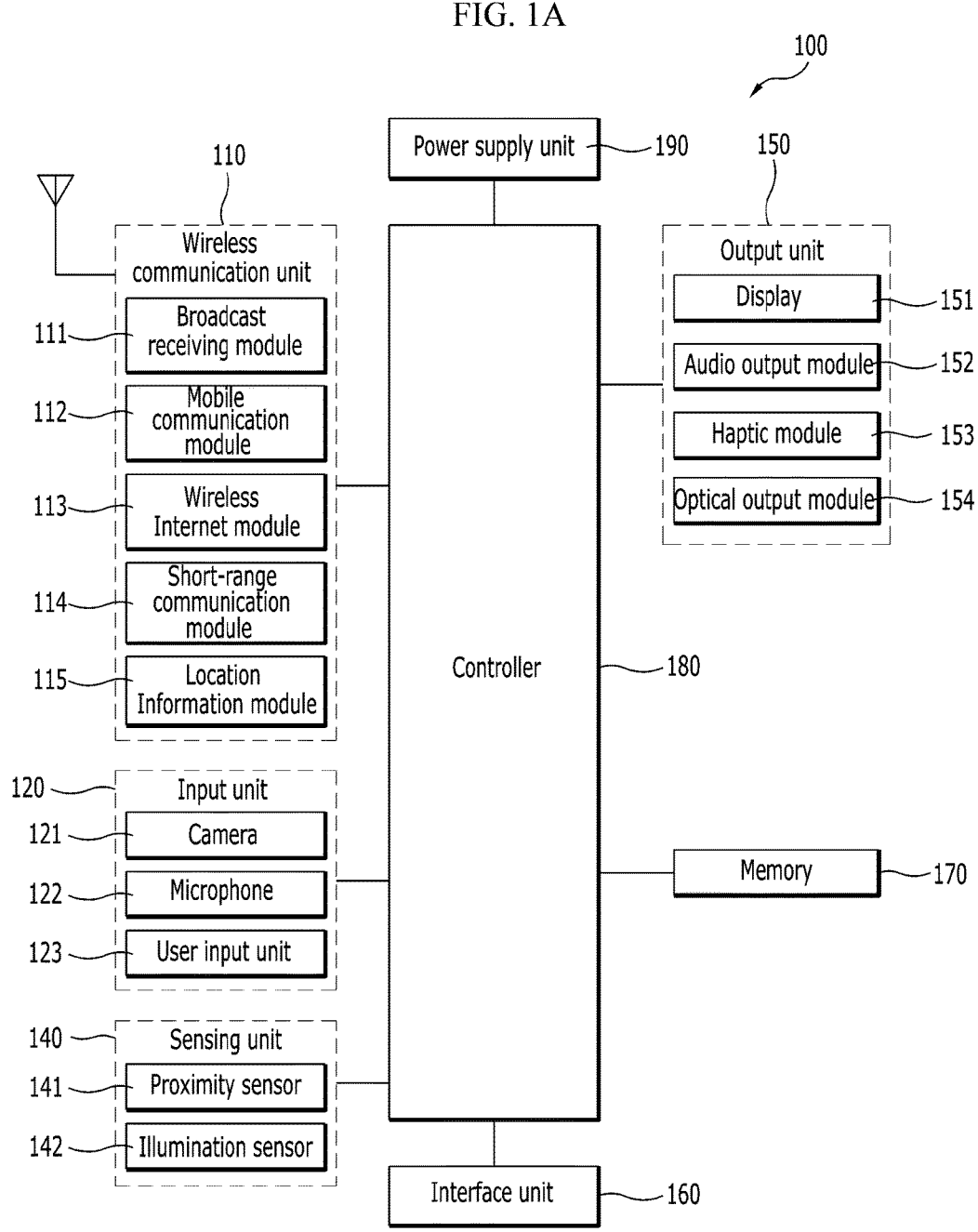

FIG. 4
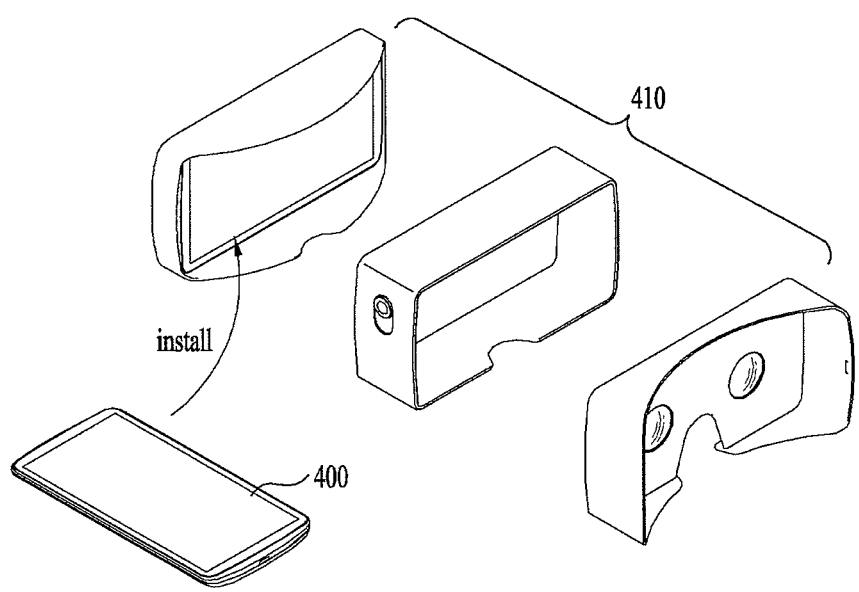
(a)
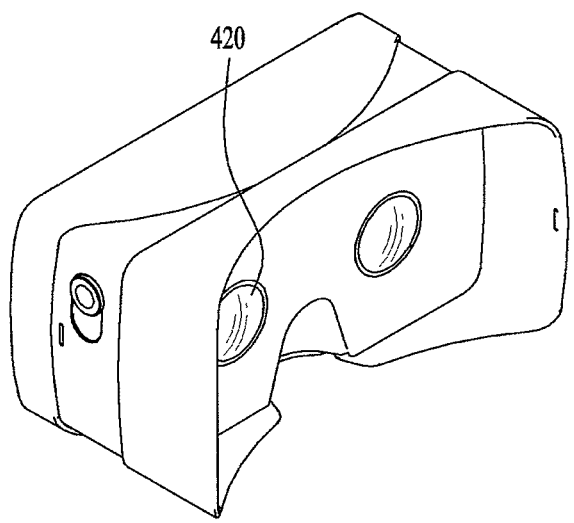
(b)

FIG. 5
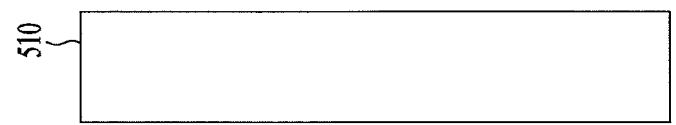
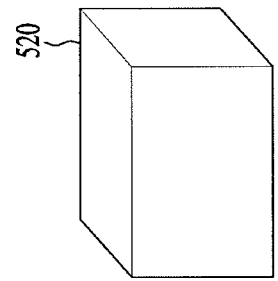
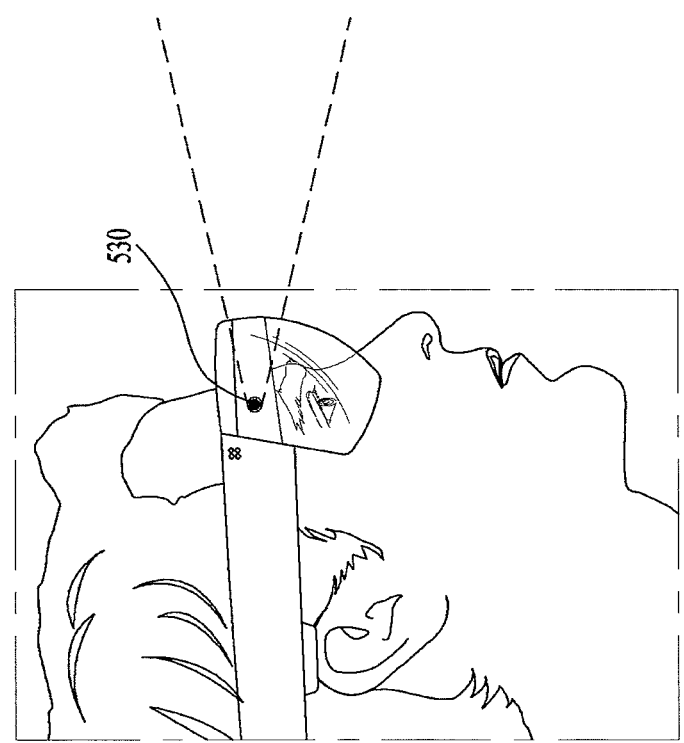

FIG. 6
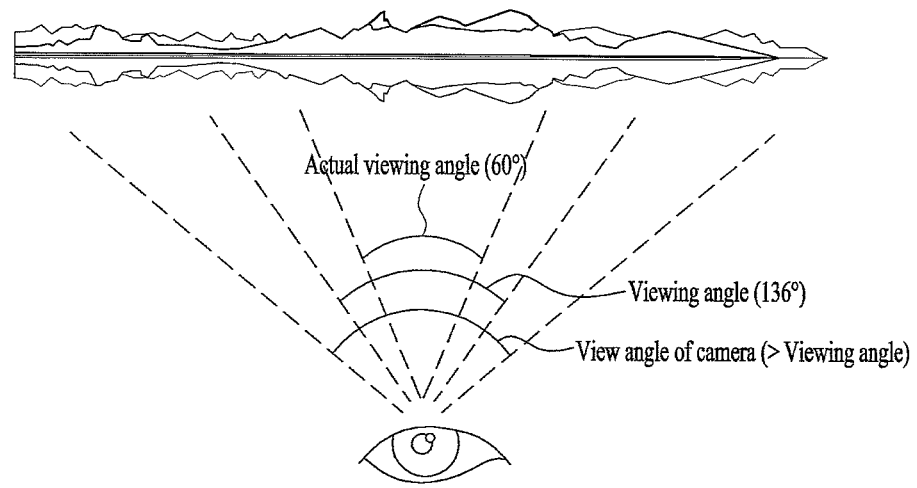
(a)
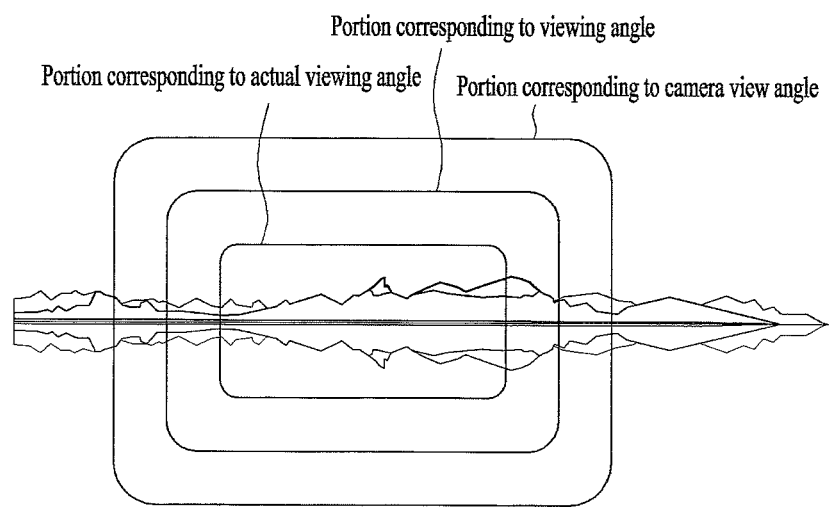
(b)

FIG. 11A
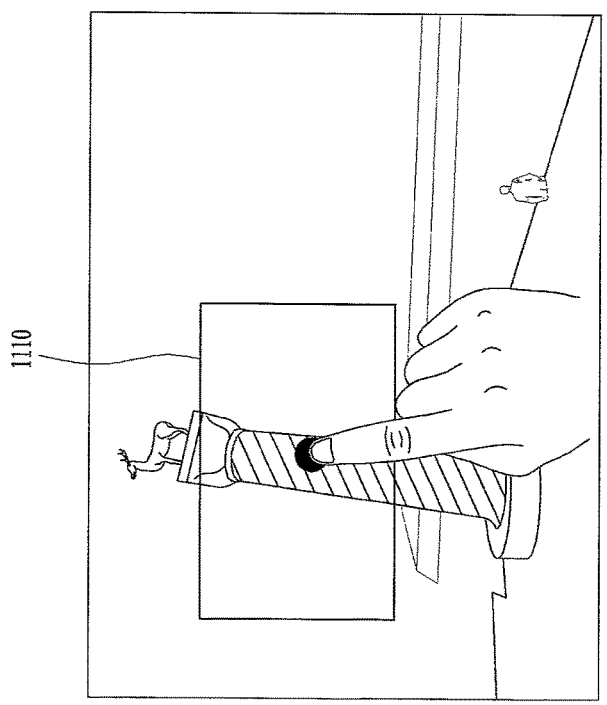
Output of tablet device
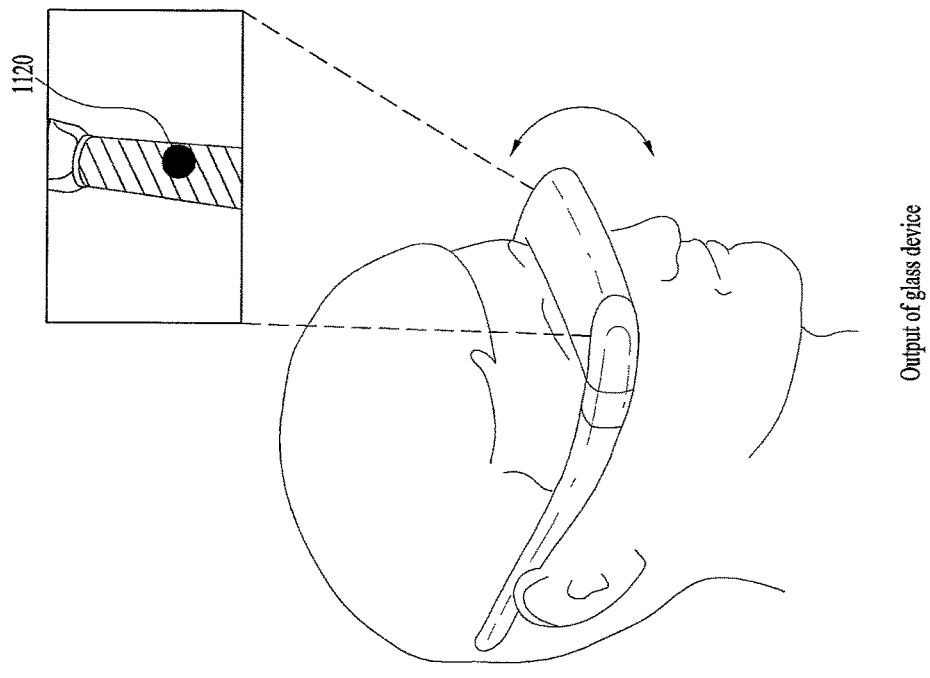
Output of glass device

MOBILE TERMINAL AND CONTROLLING METHOD THEREOF

Pursuant to 35 U.S.C. § 119(a), this application claims the benefit of earlier filing date and right of priority to Korean Application No. 10-2015-0056398, filed on Apr. 22, 2015, the contents of which are hereby incorporated by reference herein in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for sharing a photographed image using a camera having a view angle wider than a user's viewing angle.

Discussion of the Related Art

Terminals can be generally classified as mobile/portable terminals or stationary terminals. Mobile terminals can also be classified as handheld terminals or vehicle mounted terminals. A function of a mobile terminal is diversifying. For instance, the functions of the mobile terminal include data and audio communication, picture and video capturing via a camera, voice recording, playing a music file via a speaker system and outputting an image or a video on a display unit. Some terminals perform a function of an electronic game or a function of a multimedia player. In addition, a mobile terminal can receive a multicast signal providing visual contents such as a broadcast, a video and a television program.

As a function of a terminal is diversified, the terminal is implemented in a multimedia player form equipped with complex functions including capturing a picture or a video, playing music or a video file, gaming, receiving a broadcast and the like. In addition, a wearable device of a glasses type can also be carried conveniently. In particular, the wearable device of the glasses type can include a camera configured to photograph an image in the same direction of the user's eyes.

Further, the image taken through the camera can include an image of an area seen by a user currently wearing the wearable device of the glasses type. If the image photographed through the wearable device of the glasses type is output through a different terminal, a user of the different terminal can have the same user experience of the user currently wearing the wearable device of the glasses type.

SUMMARY OF THE INVENTION

Accordingly, one object of the present invention is to provide a mobile terminal and controlling method thereof that substantially obviate one or more problems due to limitations and disadvantages of the related art.

Another object of the present invention is to provide a mobile terminal and controlling method thereof, by which user's convenience can be enhanced.

Still another object of the present invention is to provide a mobile terminal and controlling method thereof, by which a photographed image can be shared with a different terminal.

Another object of the present invention is to provide a mobile terminal and controlling method thereof, by which if a prescribed point on a photographed image is selected by a different terminal, the selected point can be indicated.

To achieve these objects and other advantages and in accordance with the purpose of the invention, as embodied and broadly described herein, the present invention provides a glasses type mobile terminal including an output unit configured to output information; a camera; a wireless communication unit configured to wirelessly communicate with an external terminal; and a controller configured to transmit a first image received by the camera to the external terminal via the wireless communication unit, receive touch information from the external terminal indicating a touch input of the first image displayed on the external terminal is outside a corresponding viewing range of the glasses type mobile terminal, and display an indicator via the output unit indicating the touch input of the first image displayed on the external terminal is outside the viewing region of the glasses type mobile terminal. The present invention also provides a method of controlling a glasses type mobile terminal.

In another aspect, the present invention provides a mobile terminal including a wireless communication unit configured to receive an image from a glasses type mobile terminal; a display unit configured to display the image received from the glasses type mobile terminal; and a controller configured to distinctively display a portion of the image corresponding to a viewing range of the glasses type mobile terminal from another portion of the image not within viewing range of the glasses type mobile terminal.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIG. 4 is a diagram illustrating one example of utilizing a mobile terminal of a bar type as a mobile terminal of a glasses type;

FIG. 5 is a diagram of a mobile terminal including a projection unit;

FIG. 6 is a diagram illustrating one example to describe a difference between a human viewing angle and a view angle of a camera;

FIGS. 11A to 11C are diagrams illustrating examples of changing a type of information output through a display unit of a glass device in response to a type of a touch input received by a tablet device, respectively;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
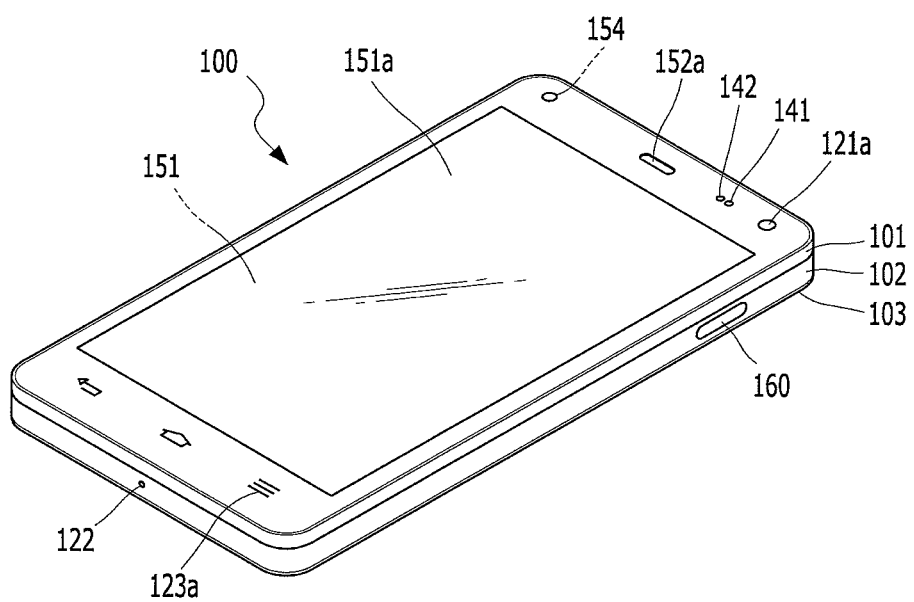
FIGS. 1B and 1C are conceptual views of one example of the mobile terminal, viewed from different directions.
Figure 1C:
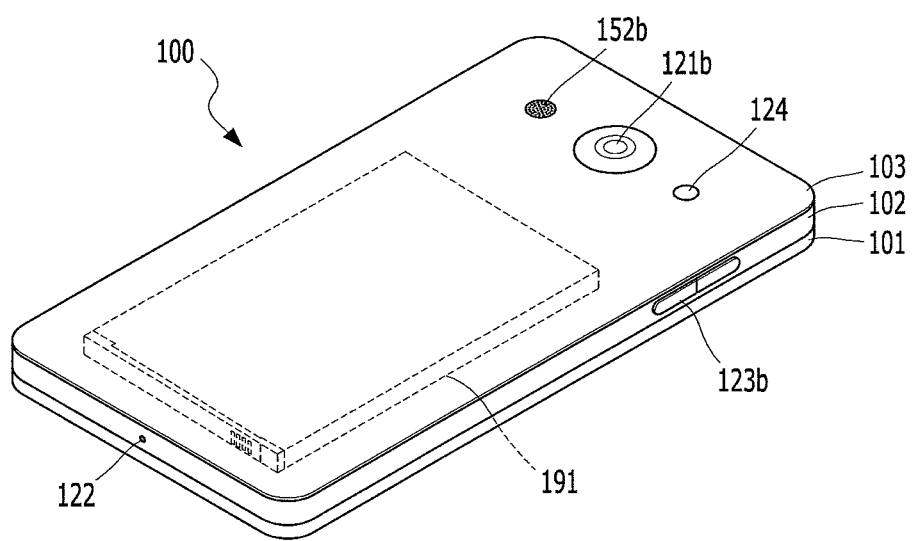

Reference is now made to FIGS. 1A-1C, where FIG. 1A is a block diagram of a mobile terminal in accordance with an embodiment of the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from the sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, the controller 180 processes data corresponding to proximity touches and proximity touch patterns sensed by the proximity sensor 141, and outputs visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of the mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
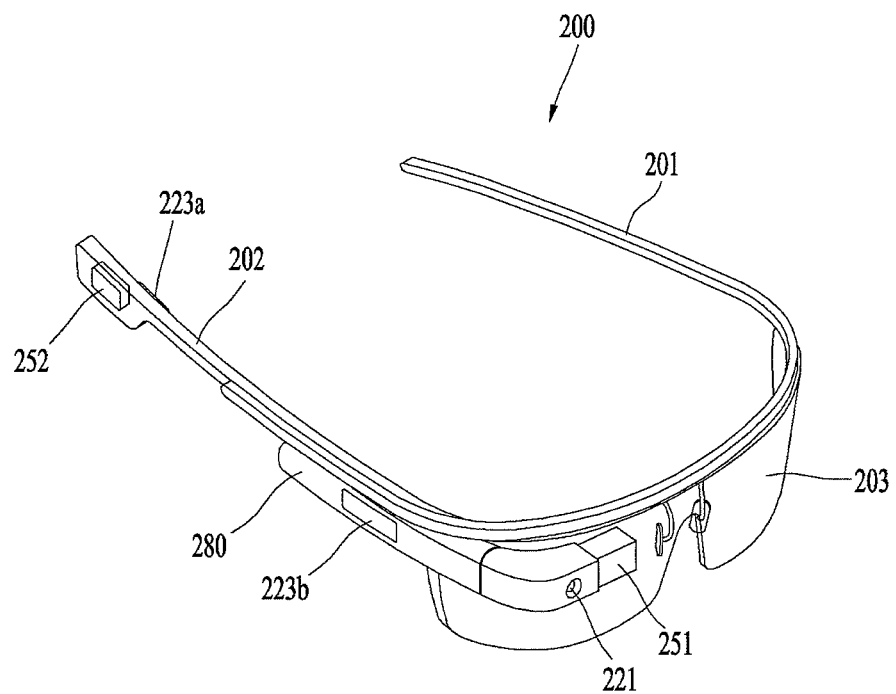
FIG. 2 is a perspective diagram illustrating one example of a mobile terminal 200 of a glasses type related to one embodiment of the present invention.

FIG. 2 is a perspective view illustrating one example of a glass-type mobile terminal 200 according to another exemplary embodiment. The glass-type mobile terminal 200 can be wearable on a head of a human body and provided with a frame (case, housing, etc.) therefor. The frame may be made of a flexible material to be easily worn. The frame of mobile terminal 200 is shown having a first frame 201 and a second frame 202, which can be made of the same or different materials. In general, mobile terminal 200 may be configured to include features that are the same or similar to that of mobile terminal 100 of FIGS. 1A-1C.

The frame may be supported on the head and defines a space for mounting various components. As illustrated, electronic components, such as a control module 280, an audio output module 252, and the like, may be mounted to the frame part. Also, a lens 203 for covering either or both of the left and right eyes may be detachably coupled to the frame part.

The control module 280 controls various electronic components disposed in the mobile terminal 200. The control module 280 may be understood as a component corresponding to the aforementioned controller 180. FIG. 2 illustrates that the control module 280 is installed in the frame part on one side of the head, but other locations are possible.

The display unit 251 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200, the display unit 251 may be located to correspond to either or both of the left and right eyes. FIG. 2 illustrates that the display unit 251 is located on a portion corresponding to the right eye to output an image viewable by the user's right eye.

The display unit 251 may project an image into the user's eye using a prism. Also, the prism may be formed from optically transparent material such that the user can view both the projected image and a general visual field (a range that the user views through the eyes) in front of the user. In such a manner, the image output through the display unit 251 may be viewed while overlapping with the general visual field. The mobile terminal 200 may provide an augmented reality (AR) by overlaying a virtual image on a realistic image or background using the display.

The camera 221 may be located adjacent to either or both of the left and right eyes to capture an image. Since the camera 221 is located adjacent to the eye, the camera 221 can acquire a scene that the user is currently viewing. The camera 221 may be positioned at most any location of the mobile terminal. In some embodiments, multiple cameras 221 may be utilized. Such multiple cameras 221 may be used to acquire a stereoscopic image.

The glass-type mobile terminal 200 may include user input units 223a and 223b, which can each be manipulated by the user to provide an input. The user input units 223a and 223b may employ techniques which permit input via a tactile input. Typical tactile inputs include a touch, push, or the like. The user input units 223a and 223b are shown operable in a pushing manner and a touching manner as they are located on the frame part and the control module 280, respectively.

If desired, mobile terminal 200 may include a microphone which processes input sound into electric audio data, and an audio output module 252 for outputting audio. The audio output module 252 may be configured to produce audio in a general audio output manner or an osteoconductive manner. When the audio output module 252 is implemented in the osteoconductive manner, the audio output module 252 may be closely adhered to the head when the user wears the mobile terminal 200 and vibrate the user's skull to transfer sounds.

As mentioned in the foregoing description with reference to FIG. 2, the display unit of the glasses type mobile terminal may be configured with HMD (head mount display). Since lens of a general glasses type mobile terminal are in transparent or semitransparent state, a user can see an external environment without any restrictions. Yet, in a mobile terminal having an HMD type display unit loaded thereon, since the display unit blocks user's eyes, a user is unable to see an external environment.

Figure 3:
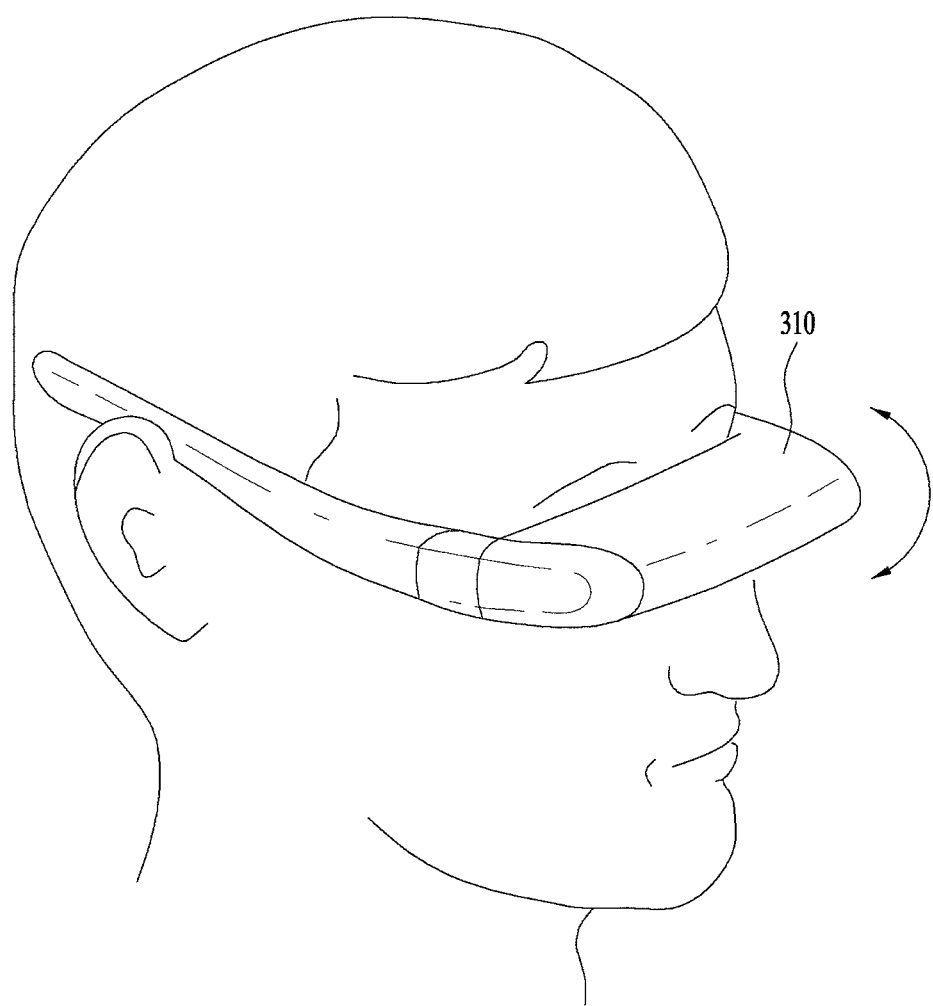
FIG. 3 is a diagram of a mobile terminal of a glasses type having a head mount display loaded thereon.

For instance, FIG. 3 is a diagram of a mobile terminal of a glasses type having a head mount display loaded thereon. Referring to FIG. 3, if a person wears a mobile terminal of a glasses type, a display unit 310 can be spread in front of eyes of the person. Since a head mount display unit 310 blocks the user's eyes, the user cannot see an external environment but can only see an output of the display unit 310.

Further, if a photographed image (e.g., a video recorded through a camera) photographed through the camera is output through the display unit 310, a user can see the external environment despite currently wearing the mobile terminal of the glasses type. Thus, the camera can be provided to a front part of the mobile terminal in the same direction of the user's eyes. If the mobile terminal of the glasses type is provided with at least two cameras, a 3D image is prepared based on images taken through a plurality of the cameras and may be then output to the display unit.

In addition, when a mobile terminal of a bar type is combined with a frame, the mobile terminal can be utilized as a mobile terminal of a glasses type. For instance, FIG. 4 is a diagram illustrating one example of utilizing a mobile terminal of a bar type as a mobile terminal of a glasses type.

Referring to FIG. 4, if a mobile terminal of a bar type is combined with a frame for establishing a VR (virtual reality) environment, the mobile terminal can be utilized as a glasses type. For instance, referring to FIG. 4 (a) and FIG. 4 (b), after a bar type mobile terminal 400 has been assembled with a frame 410, the user can watch an output of the bar type mobile terminal 400 through perforated holes 420 formed in the frame 410. One example of the frame 410 put on the market may include CardBoard™ by Google.

If a head mount display is provided, a view of a user currently wearing the glasses type mobile terminal is limited by the display unit. In particular, since the display unit blocks the view, the user can watch the output from the display unit only but is unable to see an external environment. Yet, if a photographed image of a camera for photographing the same direction of user's eyes is displayed through the display unit, the user can see the external environment despite wearing the glasses type mobile terminal.

The mobile terminal of the glasses type may include a projection unit configured to project a graphic image such as a 2D image, a 3D image, a hologram and the like in a space within a range of a user's view instead of a display unit disposed in front of user's eyes. In this instance, the user can watch an external environment through the transparent or semitransparent glasses and a graphic image projected in a space.

For instance, FIG. 5 is a diagram of a mobile terminal including a projection unit. As shown in the example in FIG. 5, a mobile terminal of a glass device can send information to a user by projecting a graphic image into a space. Hence, the user can simultaneously watch a real external environment 510 and a graphic object 520 projected into the space. For example, the glasses type mobile terminal including a projection unit 530 configured to project a graphic image into a space may include HoloLens™ by Microsoft.

Based on the above description, a mobile terminal according to an embodiment of the present invention is described in detail as follows. First of all, an embodiment of the present invention relates to a method of outputting an image, which is photographed through one mobile terminal, through another mobile terminal using a communication between the two mobile terminals.

For clarity convenience of the following description, in the following drawings, one mobile terminal configured to provide an image photographed through a camera to another mobile terminal is assumed as a glasses type and one mobile terminal configured to receive a photographed image from another mobile terminal is assumed as a bar type mobile terminal such as a smartphone, a tablet device or the like. Moreover, a mobile terminal of a glasses type is called a glass device and a mobile terminal of a bar type is called a tablet device. According to the embodiments mentioned in the following description, names of components may be determined as a component included in a glass device or a component included in a tablet device in accordance with a context.

A glass device includes a camera that can be exposed to a front side of the glass device. If the camera is mounted to photograph the same direction of eyes of a user currently wearing the glass device, the camera can capture a part viewed by the user currently wearing the glass device.

Generally, a human viewing angle is about 136 degrees. However, because the human optic nerve is concentrated on a central part of a retina, a recognition rate of an area beyond a range of a viewing angle over 60 degrees is reduced. In particular, because an actual viewing angle of a person amounts to about 60 degrees only, an area beyond the viewing angle is not recognizable correctly.

If a view angle of a camera exposed through a front side of a mobile terminal of a glass device is greater than 60 degrees, the camera can capture a part of which human recognition rate is reduced as well. Moreover, if a view angle of a camera is greater than 136 degrees, the camera can capture a part that cannot be seen by a person as well as a part of which human recognition rate is reduced.

For instance, FIG. 6 is a diagram illustrating one example to describe a difference between a human viewing angle and a view angle of a camera. Referring to FIG. 6, assuming that a range clearly recognizable by a person corresponds to a part belonging to viewing angles equal to or smaller than 60 degrees, if a view angle of a camera is greater than 60 degrees, the camera can capture a part of which human recognition rate is reduced as well. Moreover, assuming that a human viewing angle is 136 degrees, if a view angle of a camera is greater than 136 degrees, the camera can capture a part that cannot be seen by a user as well.

In particular, like the examples shown in FIG. 6 (*a*) and FIG. 6 (*b*), if a view angle of a camera is wide enough, the camera can capture a part that cannot be seen by a person as well as a part of which human recognition rate is reduced. According to the embodiment described in the following, since a view angle of a camera is wide enough, assume that the camera can capture a part that cannot be seen by a person or a part of which human recognition rate is reduced.

If a glass device is provided with a head mount display, as shown in FIG. 3 or FIG. 4, a controller of the glass device can control a partial region in a photographed image to be output through a display unit. For instance, the controller of the glass device can output an image, which corresponds to an area (e.g., an area corresponding to a viewing angle of 60 degrees) seen by a user, in an image photographed through a camera to the display unit.

Figure 7:
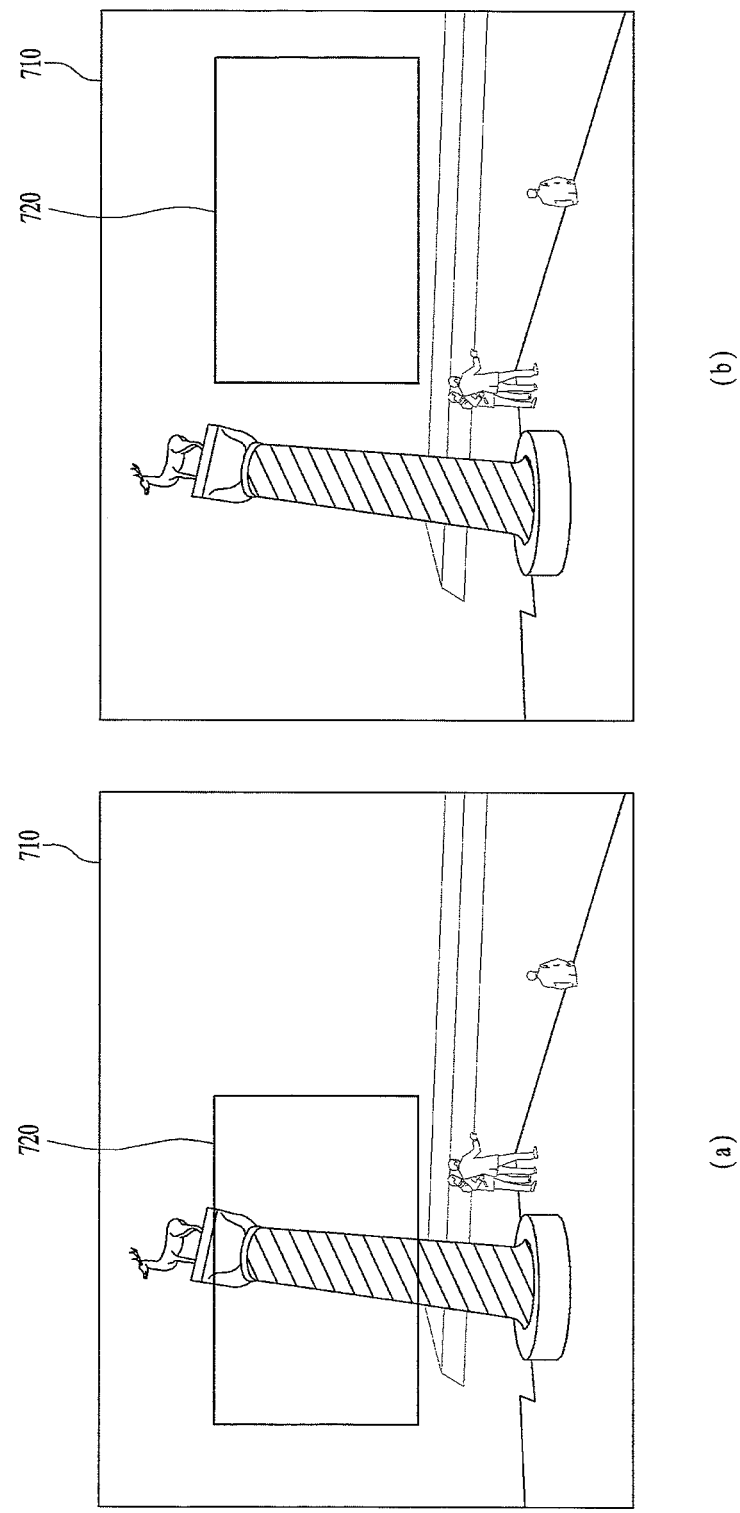
FIG. 7 is a diagram illustrating one example of outputting a portion of a photographed image through a display unit.

For instance, FIG. 7 is a diagram illustrating one example of outputting a portion of a photographed image through a display unit. Referring to FIG. 7, as mentioned in the foregoing description with reference to FIG. 6, when a view angle of a camera is greater than a viewing angle of a user, the camera can capture a space wider than a space recognizable by a user. Further, as shown in the example in FIG. 7 (*a*), the controller can output a portion 720 of a photographed image instead of outputting a whole image 710 captured by the camera through the display unit. If the portion 720 output through the display unit corresponds to a part watched by a user failing to wear a glass device, while the user wears the glass device, the user can watch the same external environment as seen in case of not wearing the glass device.

If the user currently wearing the glass device moves their pupils, a location of a portion 720, which is to be displayed, in the photographed image 710 can be changed. For instance, if the pupils of the user currently wearing the glass device are moved to the right, as shown in the example in FIG. 7 (*b*), the location of the portion 720, which will be output through the display unit, in the photographed image 710 can be moved to the right as well. Thus, a camera or sensor for tracking a location of a user's pupil can be embedded in an inner surface of the glass device.

As shown in the example in FIG. 5, if the glasses are in a transparent or semitransparent state, it may be unnecessary to output a photographed image captured by the camera through the display unit (or the projection unit). Even if the photographed image is not output, a user can see the external environment through the glasses. Yet, in this instance, the controller of the glasses type can transmit a location information of a portion of the photographed image currently watched by the user currently wearing the glass device to a mobile terminal of a tablet type. In this instance, the location information may include coordinates information of the portion currently watched by the user of the glass device, information (e.g., a setup value for calculating a location of pupils of the user currently wearing the glass device or the portion currently watched by the user of the glass device, etc.) for calculating the portion currently watched by the user of the glass device, or the like.

For clarity and convenience of the following description, a region output through a display unit of a glass device in an image captured by a camera of the glass device or a region corresponding to a portion currently watched by a user in an image captured by a camera of a glass device shall be named 'viewing region'. In particular, according to the embodiments mentioned in the following description, a viewing region may mean a region output through a display unit of a glass device in an image captured by the glass device or a region corresponding to a portion currently watched by a user in an image captured by the glass device.

In the following description, embodiments will be described in detail on the assumption that a mobile terminal of a glass type is provided with a head mount display like the former example shown in FIG. 4. Yet, the embodiments mentioned in the following description are applicable to a glass device not including a head mount display.

For instance, the embodiments mentioned in the following description can be applied to a mobile terminal including a projection unit configured to project a graphic image into a space by being provided with the transparent or semitransparent glasses like the former example shown in FIG. 5. In this instance, the mobile terminal can skip outputting a photographed image captured by a camera and can output information required for a user by projecting a graphic image into a space instead of using a display unit. In particular, when the embodiments mentioned in the following description are applied to the glass device of the type shown in FIG. 5, the configuration for displaying the photographed image captured by the camera of the glass device through the display unit of the glass device can be omitted. In addition, the configuration for outputting the information (e.g., an indicator, a photographed image received from the tablet device, etc.) through the display unit of the glass device can be substituted with the configuration for outputting the information (e.g., an indicator, a photographed image received from the tablet device, etc.) to a space through the projection unit.

In another instance, the embodiments mentioned in the following description can be applied to the glass device of the type shown in FIG. 2. Although the two mobile terminals appearing in the following embodiments are assumed as a glass type and a bar type, respectively, the applicability of the following embodiments is non-limited by the mobile terminals of the two types.

For instance, although a device (e.g., a contact lens type wearable device, a necklace type wearable device, etc.) capable of photographing the same direction of user's eyes is used instead of a mobile terminal of a glass type for sending a photographed image, the embodiments mentioned in the following description are applicable and a communication with another terminal can be performed instead of a mobile terminal of a bar type. In addition, the embodiments mentioned in the following description are applicable to a device (e.g., a wearable device, etc.) having a display unit.

Figure 8:
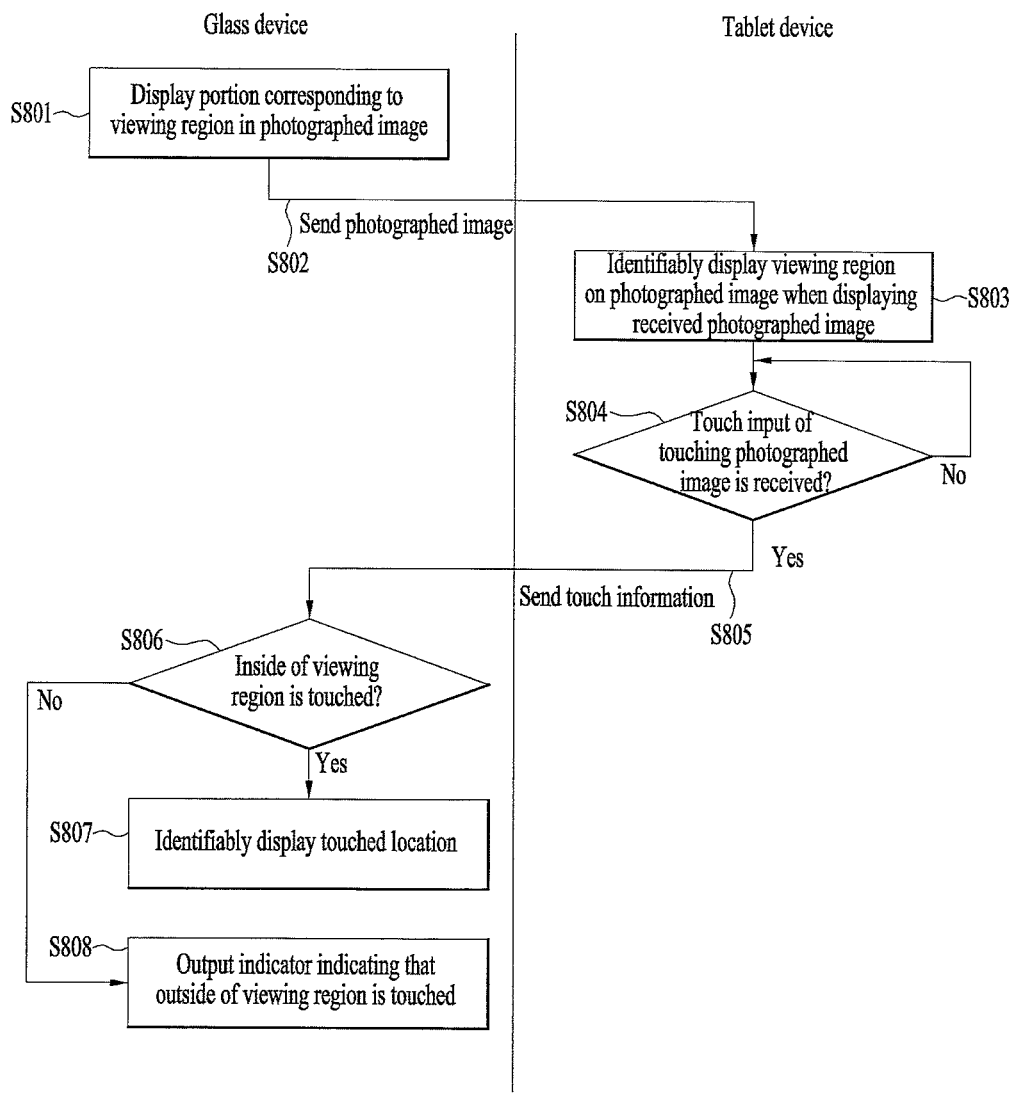
FIG. 8 is a flowchart of a photographed image sharing method according to an embodiment of the present invention.

Next, FIG. 8 is a flowchart of a photographed image sharing method according to an embodiment of the present invention. For clarity and convenience of the following description, assume that a wireless communication channel is currently established between a glass device and a tablet device. For instance, if a video call starts between a glass device and a tablet device, a wireless communication channel for transceiving image data has been established between the glass device and the tablet device. In this instance, the glass device and the tablet device can perform the communication using such a communication technology as Bluetooth, WLAN (e.g., Wi-Fi, etc.) and/or the like and/or such a cellular technology as LTE, HSPDA and/or the like.

Once the wireless communication channel is established between the glass device and the tablet device, the glass device displays an image corresponding to a viewing region in a photographed image (e.g., a video filmed through a camera, etc.) captured by the camera (S801) and can then send the photographed image to the tablet device (S802). When a plurality of cameras are included in the glass device, the photographed image sent to the tablet device may include a 3D image created based on the photographed images captured by a plurality of the cameras. Having received the photographed image from the glass device, the tablet device displays the received photographed image and can control the viewing region to be identifiably displayed on the displayed photographed image (S803).

Figure 9:
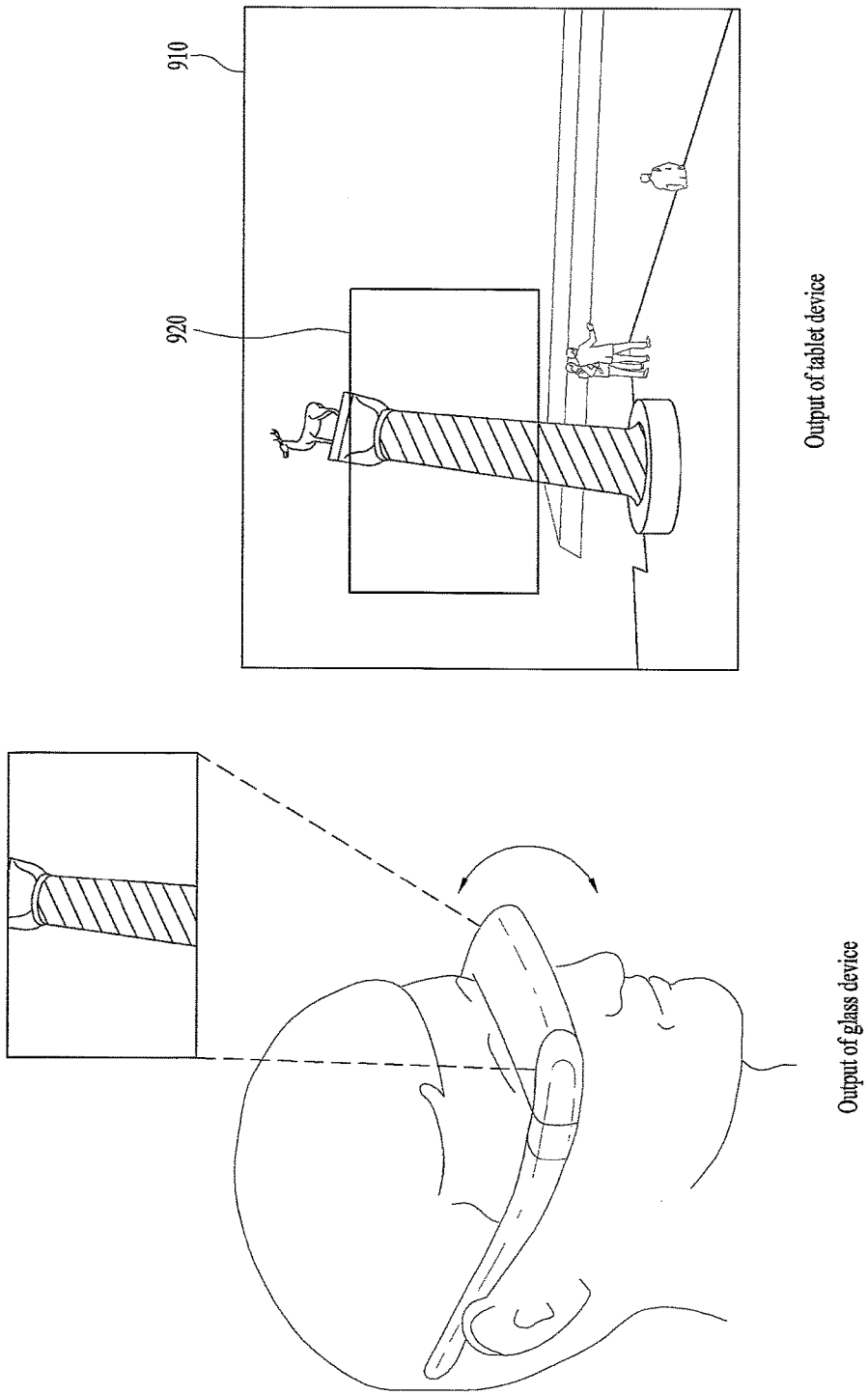
FIG. 9 is a diagram illustrating one example of identifiably displaying a viewing region on a photographed image.

For instance, FIG. 9 is a diagram illustrating one example of identifiably displaying a viewing region on a photographed image. Referring to FIG. 9, if the photographed image captured by the glass device is received, the controller of the tablet device can control the received photographed image 910 to be output through the display unit. In addition, the controller of the tablet device can control the viewing region 920 to be identifiably displayed on the photographed image 910.

According to the example shown in FIG. 9, a rectangle is displayed on the photographed image 910, whereby the viewing region 920 is identifiably displayed. Through the identifiable mark of the viewing region, a user of the tablet device can distinguish a region watched by a user currently wearing the glass device from a region failing to be watched by the user currently wearing the glass device. In particular, an inside image of the viewing region can be recognized as the region currently watched by the user currently wearing the glass device, while an outside image of the viewing region can be recognized as the region failing to be watched by the user currently wearing the glass device.

While the tablet device is displaying the photographed image, if a touch input to the display unit of the tablet device is received (Yes in S804), the tablet device can send the touch information to the glass device (S805). In this instance, the touch information may include at least one of information on a touch location on the photographed image, information indicating whether an inside of the viewing region is touched, information on a distance to a touched location from a center (or edge) of the viewing region, information on a direction from the center of the viewing region to the touch location, and information on a touch type (e.g., information indicating that a user's touch input is a simple touch, a long touch, a drag input, or the like).

If the touch information is received from the table device, the glass device can determine whether an inside or an outside of the viewing region is touched based on the received touch information. If determining that the inside of the viewing region is touched (Yes in S806), the glass device can display a location of the touch input received through the table device on the output photographed image (S807).

Figure 10:
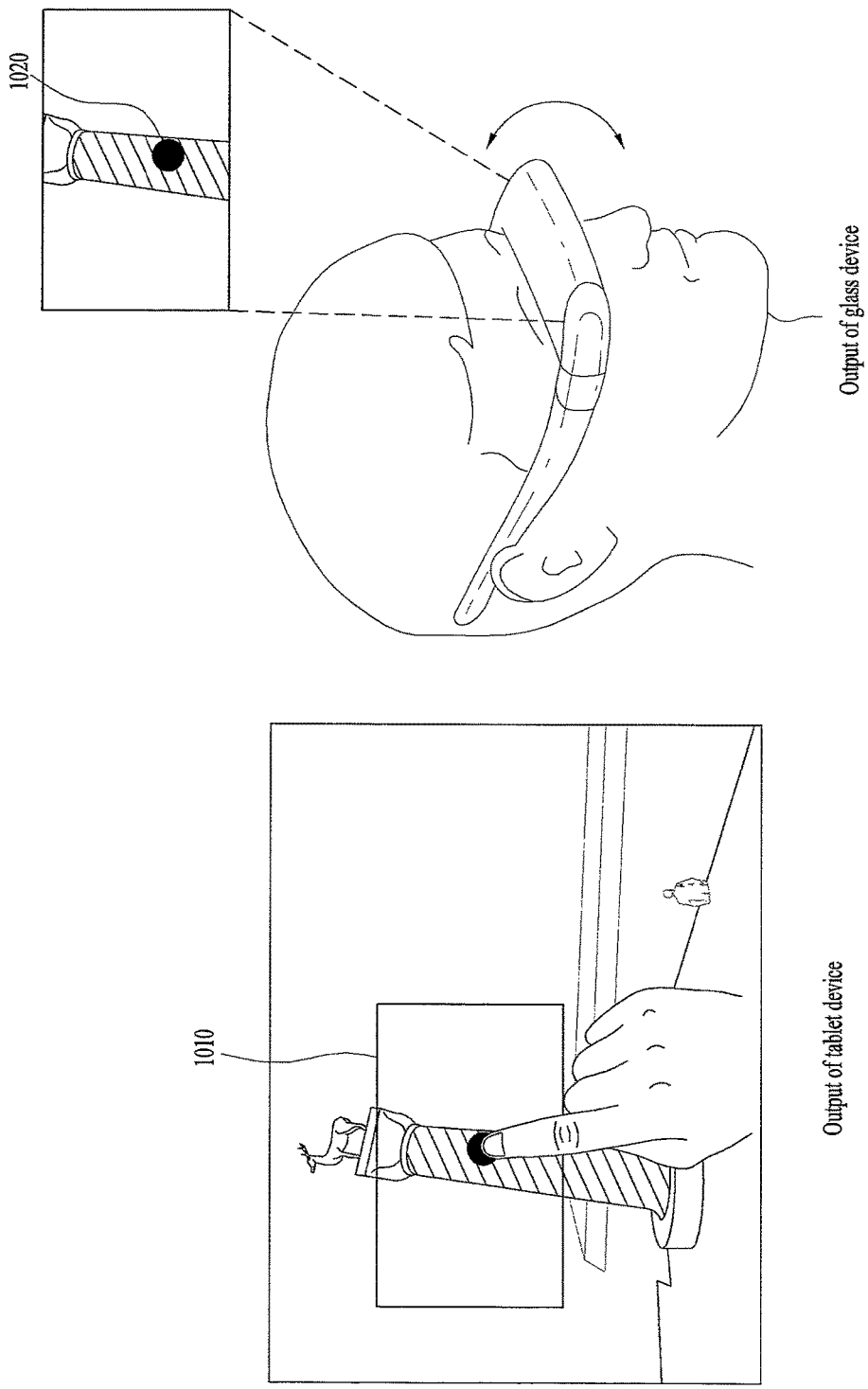
FIG. 10 is a diagram illustrating one example of identifiably displaying a touch location on a photographed image.

For instance, FIG. 10 is a diagram illustrating one example of identifiably displaying a touch location on a photographed image. Referring to FIG. 10, if the touch information is received from the tablet device, the controller of the glass device can control a portion, which corresponds to the touch location indicated by the touch information, to be identifiably displayed on the photographed image output through the display unit.

According to the example shown in FIG. 10, as a touch input for touching an inside of a viewing region 1010 is received through the table device, an indicator 1020 in a circle shape is output to the touch location indicated by the touch information through the display unit of the glass device. In addition, the controller of the glass device can output feedback to indicate that the inside of the viewing region is touched. In this instance, the feedback can include at least one of vibration, alarm sound, illumination (e.g., LED, etc.) and the like. The controller of the glass device can adjust a type of the information displayed at the touch location in accordance with a type of the touch input received by the tablet device.

Figure 11B:
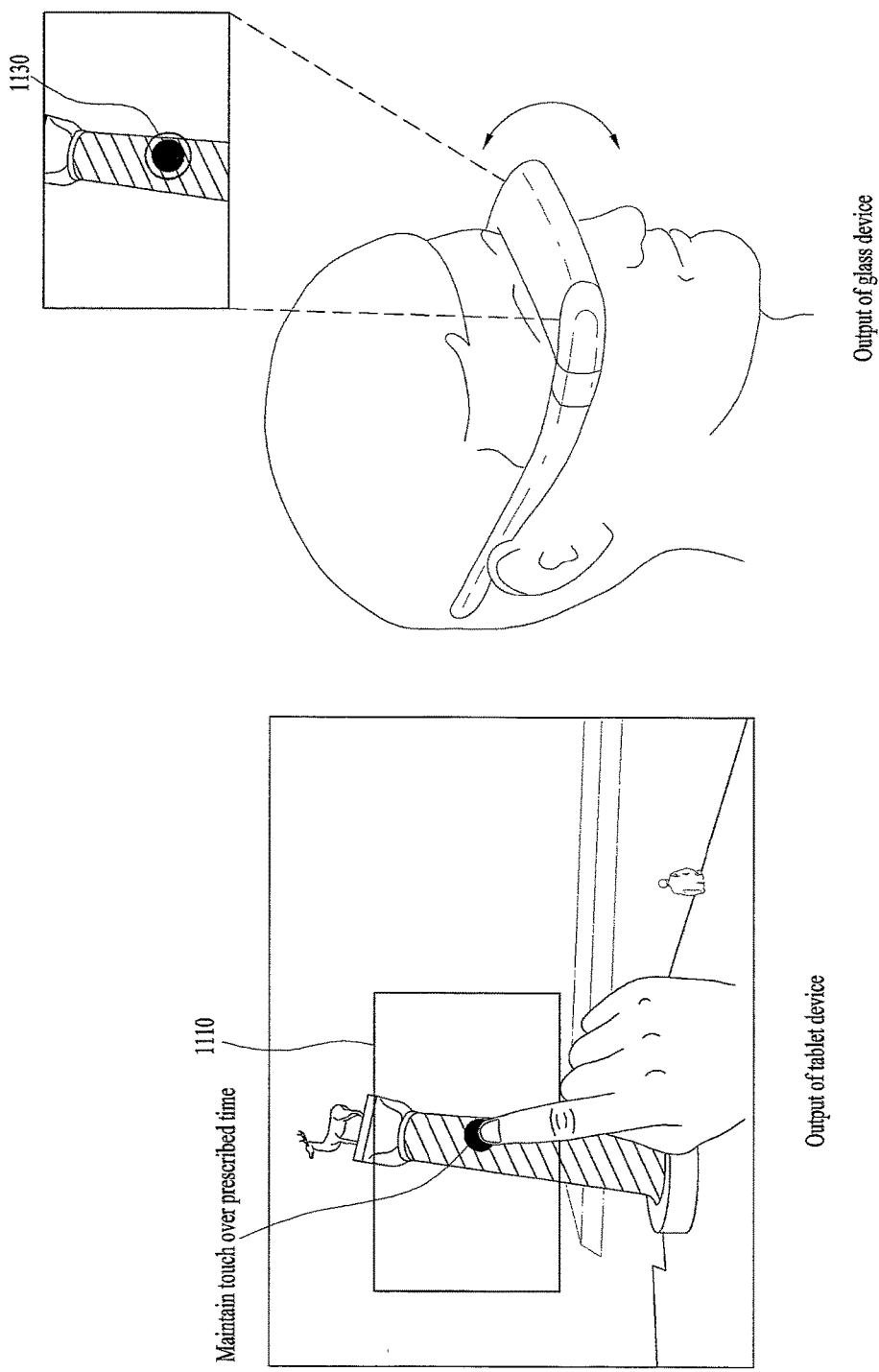
Figure 11C:
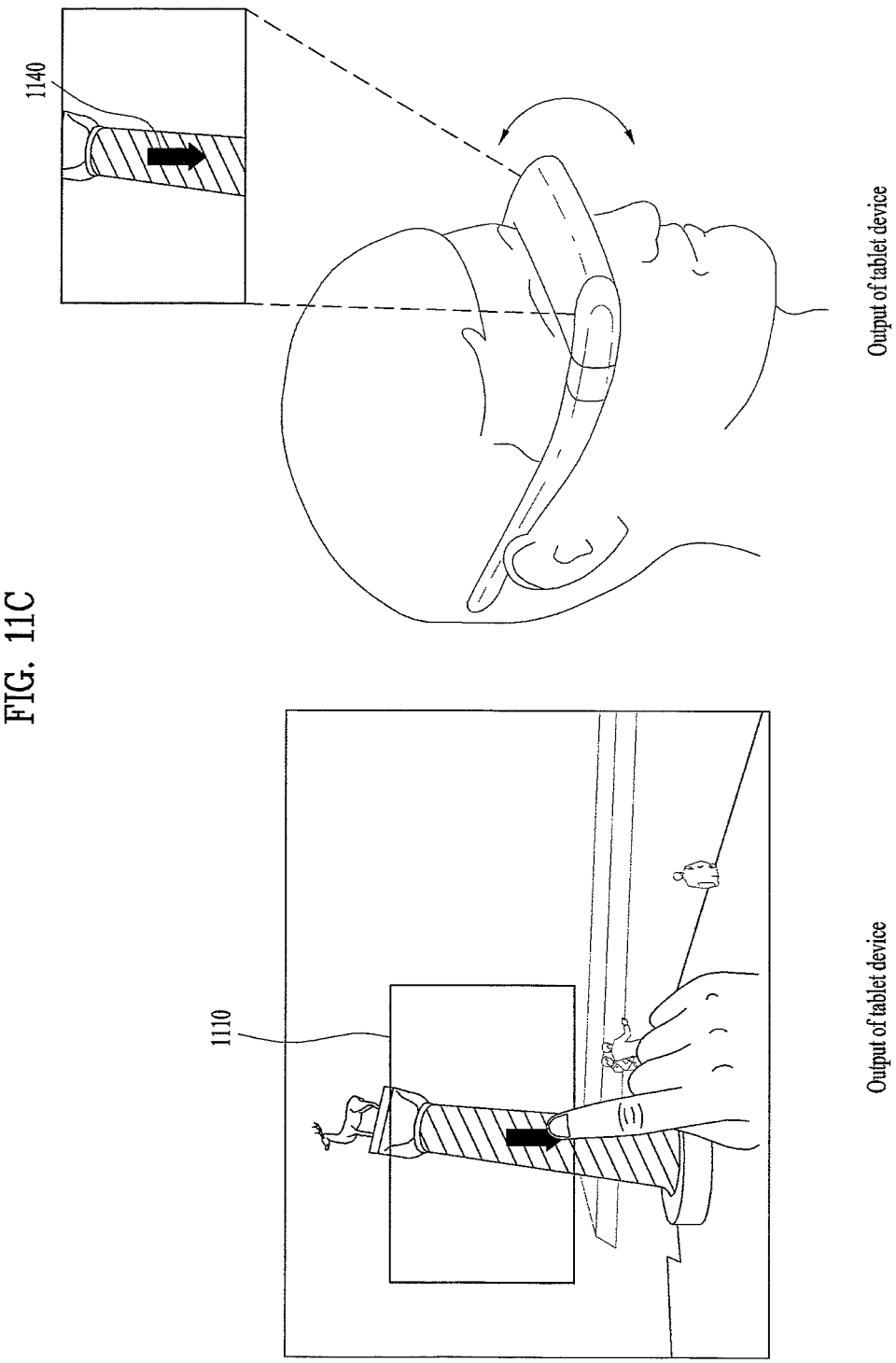

For instance, FIGS. 11A to 11C are diagrams illustrating examples of changing a type of information output through a display unit of a glass device in response to a type of a touch input received by a tablet device, respectively. Referring to FIG. 11A, if a touch input of applying a simple touch (i.e., an input of applying a touch to a prescribed point and then releasing the touch) to an inside of a viewing region 1110 is received through the tablet device, a first indicator 1120 indicating a touch location can be output through the display unit of the glass device.

Referring to FIG. 11B, if a touch input of applying a long touch (i.e., an input of touching a prescribed point over a prescribed time) to an inside of a viewing region 1110 is received through the tablet device, a second indicator 1130 indicating a long touch location can be output through the display unit of the glass device. Referring to FIG. 11C, if a drag input within an inside of a viewing region 1110 is received through the tablet device, a third indicator 1140 in an arrow shape following a drag trace can be output through the display unit of the glass device.

In particular, like the examples shown in FIGS. 11A to 11C, depending on the type of the touch input received through the tablet device, the controller of the glass device can adjust a shape of the indicator that will be output through the display unit of the glass device. Further, if determining that the outside of the viewing region is touched (S806), the controller of the glass device can control an indicator to be output to indicate that the viewing region outside has been touched (S808). If the outside of the viewing region is touched, the touch location, which is indicated by the touch information, on the photographed image can be identifiably displayed.

Figure 12:
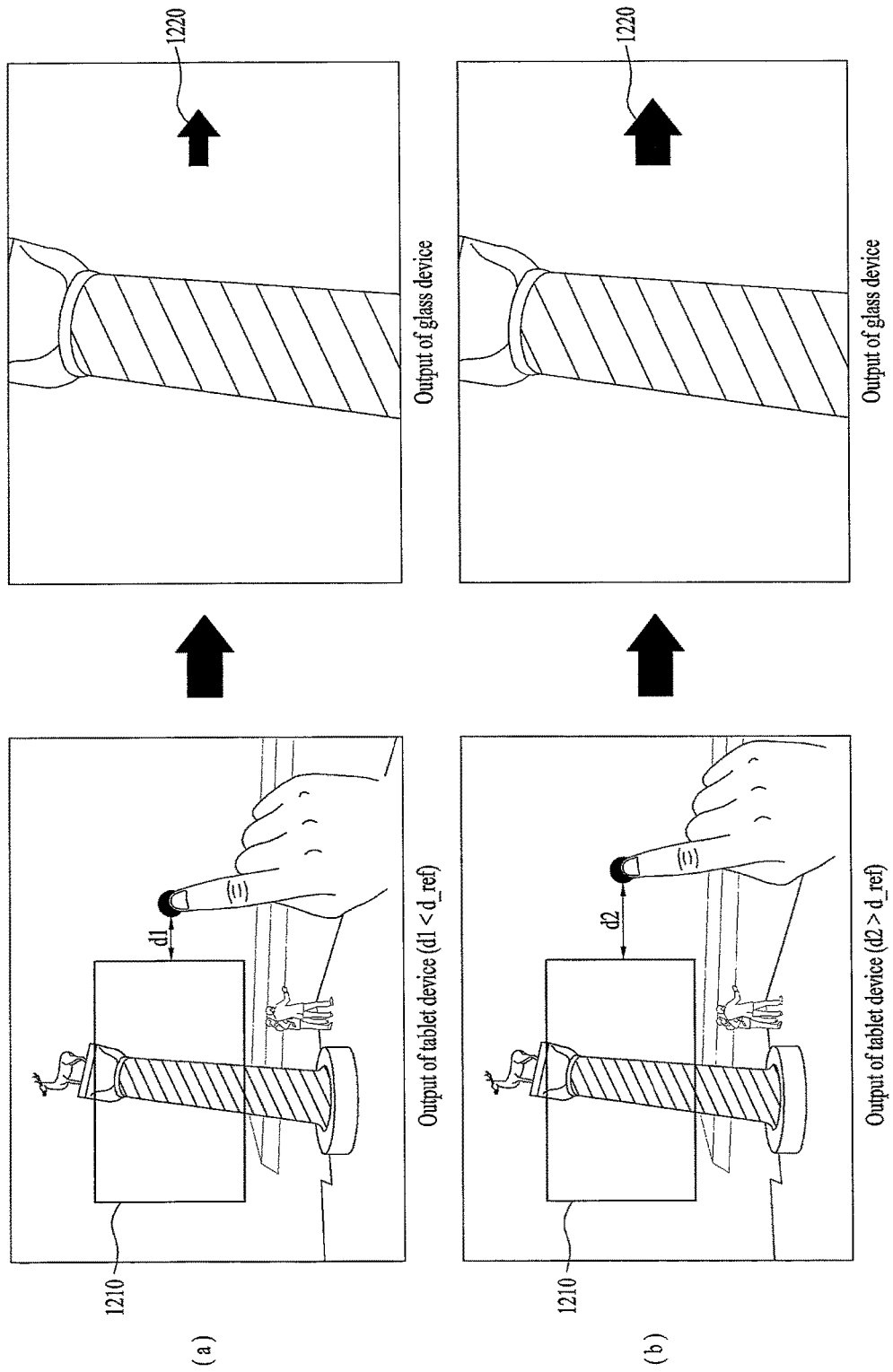
FIG. 12 is a diagram illustrating one example of outputting an indicator.

For instance, FIG. 12 is a diagram illustrating one example of outputting an indicator. Referring to FIG. 12, if a touch input received through the tablet device is a touch to an outside of a viewing region 1210, the controller of the glass device can output an indicator 1220, which indicates that the outside of the viewing region has been touched, through the display unit. Further, referring to FIG. 12 (a) and FIG. 12 (b), the indicator 1220 may have an arrow shape that faces a touch location. If so, a user can recognize that a region outside the viewing region distributed in the direction indicated by the arrow has been touched.

Further, the controller can control a size of the arrow to increase in proportion to a distance between the touch location and the viewing region. For instance, if the distance between the touch location and the viewing region is equal to or smaller than a preset reference value d_ ref, as shown in the example in FIG. 12 (a), the controller of the glass device outputs an arrow in a small size. Further, if the distance between the touch location and the viewing region gets greater than the preset reference value d_ ref, as shown in the example in FIG. 12 (b), the controller of the glass device can control an arrow in a large size to be output.

As a user turns their head, if the distance between the touch location and the viewing region decreases, the controller can control the size of the arrow to decrease. On the contrary, if the distance between the touch location and the viewing region increases, the controller can control the size of the arrow to increase.

In another instance, if the number of touch inputs of touching a viewing region outside through the tablet device increases, the size of the arrow output through the glass device can increase. For instance, in response to a first touch input received through the tablet device, as shown in the example in FIG. 12 (a), the controller of the glass device outputs the arrow in a small size. Further, if the tablet device receives a touch input of retouching an adjacent location before the elapse of a prescribed time after the first touch response, as shown in the example in FIG. 12 (b), the controller of the glass device can control an arrow in a large size to be output.

Figure 13:
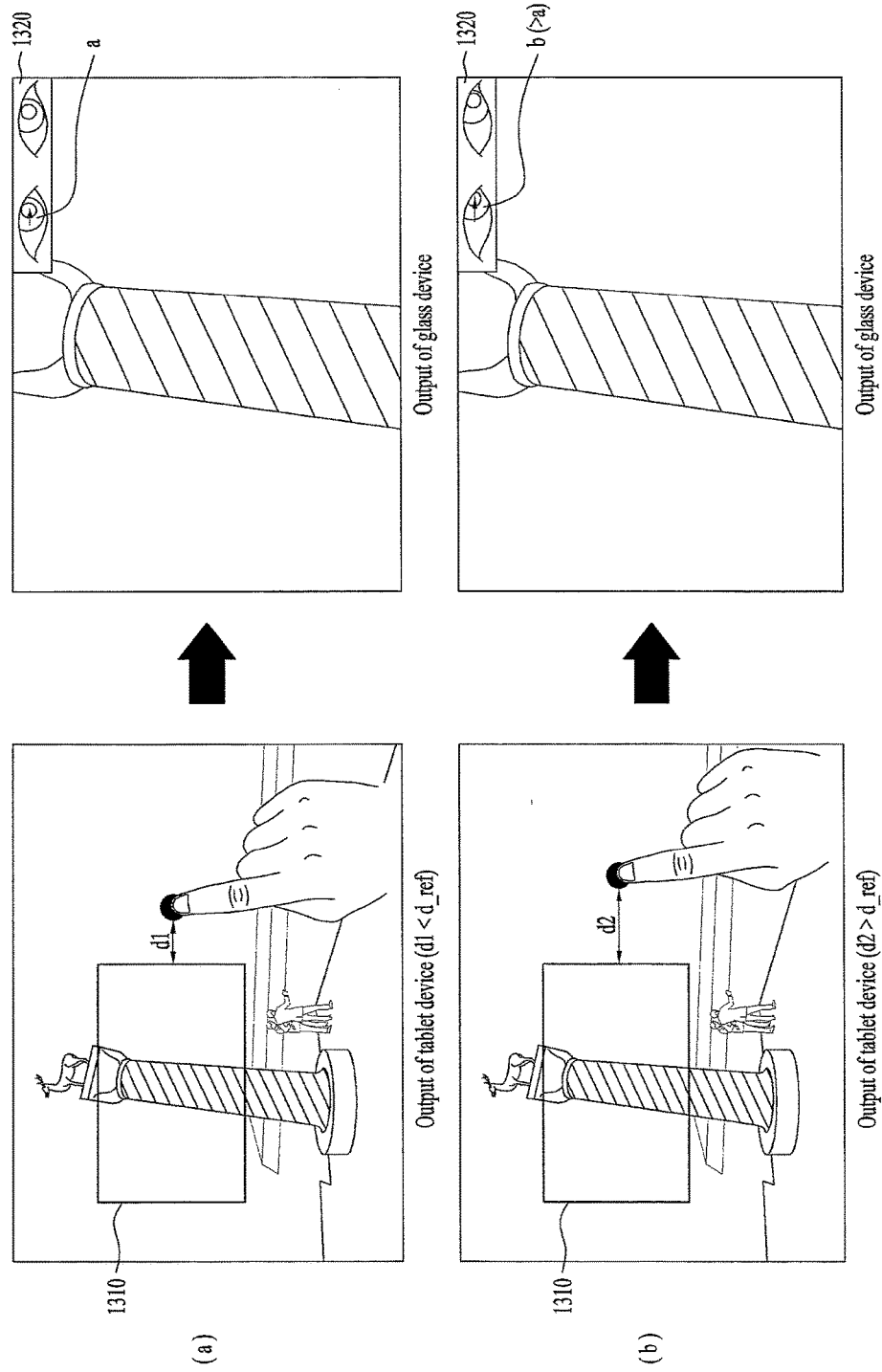
FIG. 13 is a diagram illustrating one example of outputting an indicator in the shape of eyeballs.

According to the example shown in FIG. 12, the indicator has the shape of the arrow. However, the indicator may have an image of eyes or an image of the user's face. For instance, FIG. 13 is a diagram illustrating one example of outputting an indicator in the shape of eyeballs. Referring to FIG. 13, if a touch input received through the tablet device is a touch to an outside a viewing region 1310, the controller of the glass device can output an image 1320 taking of eyeballs as an indicator through the display unit.

Further, the locations of the pupils in the eyeball image 1320 can be disposed to face the touch location. For example, if a right part of a viewing region outside is touched, as shown in FIG. 13 (a), the controller can control the locations of the pupils in the human eyeball image 1320 to be disposed to the right side. Moreover, if the distance between the touch location and the viewing region increases more, the controller can control the pupil to be disposed closer to an edge of the image.

For instance, if the distance between the touch location and the viewing region is equal to or smaller than a preset reference value d1, as shown in the example in FIG. 13 (a), the controller of the glass disposes the pupil at the location spaced apart by 'a' from the center of the eyeball image 1320. Subsequently, if the distance between the touch location and the viewing region becomes greater than the preset value, as shown in the example in FIG. 13 (b), the controller of the glass device can dispose the pupil at a location spaced apart by 'b (>a)' from the center of the eyeball image 1320.

As a user turns their head, if the distance between the touch location and the viewing region gets smaller, the controller can dispose the pupil to get closer to the center of the eyeball image. On the contrary, if the distance between the touch location and the viewing region gets greater, the controller can dispose the pupil to get farther from the center of the eyeball image.

Figure 14:
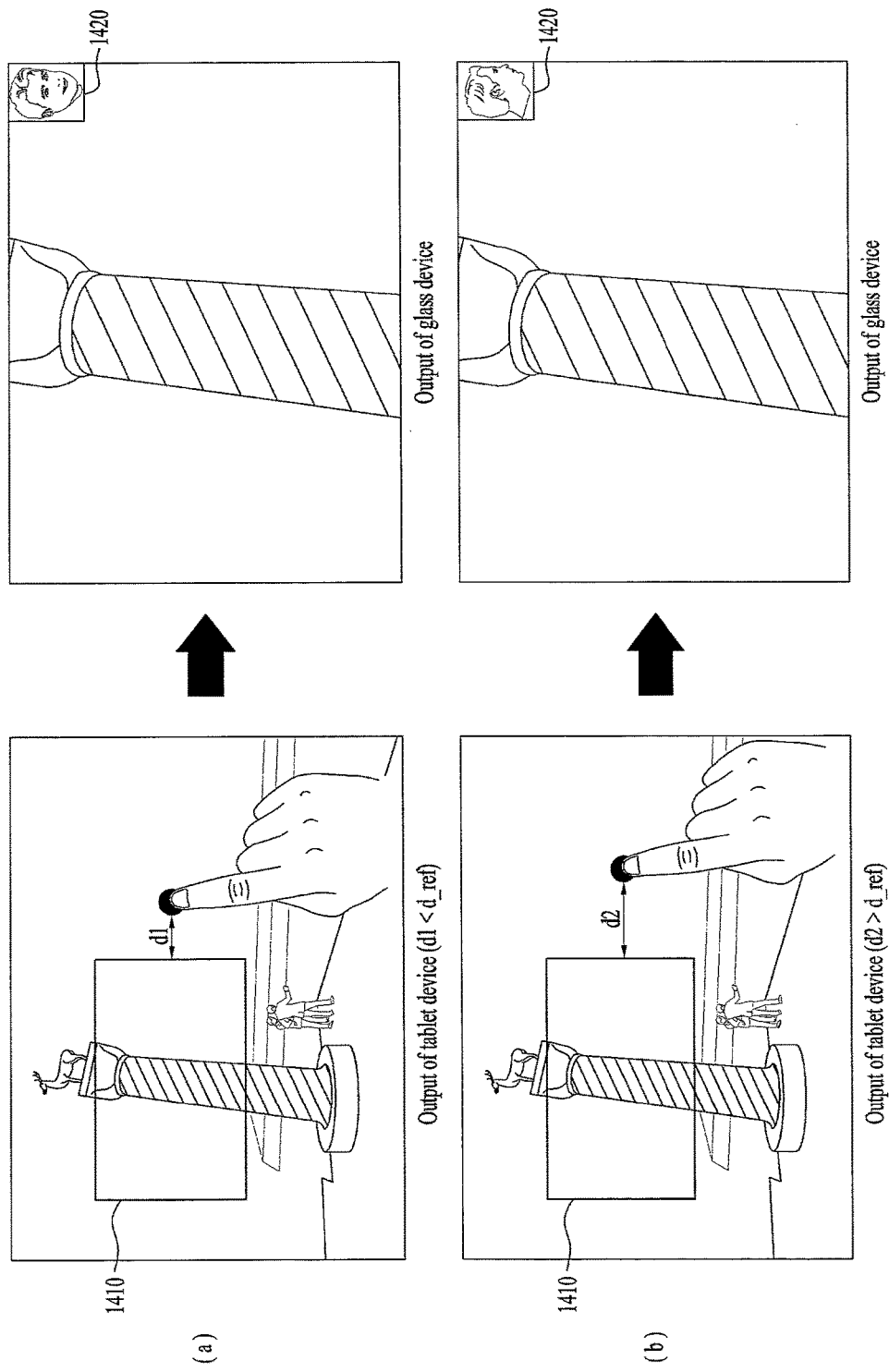
FIG. 14 is a diagram illustrating one example of outputting an indicator in the shape of a user's face.

FIG. 14 is a diagram illustrating one example of outputting an indicator in the shape of a user's face. Referring to FIG. 14, if a touch input received through the tablet device is a touch to an outside of a viewing region 1410, the controller of the glass device can output an image 1420 of a face as an indicator through the display unit.

Further, the controller can control a direction faced by the face image 1420 to be set toward the touch location. For instance, if a right part of an outside of the viewing region is touched, as shown in the example in FIG. 14 (a), the controller can control the face image 1420, which faces the right side, to be output. In addition, if the distance between the touch location and the viewing region increases more, the controller can control a head turned extent to increase.

For instance, the controller of the glass device can control the face image 1420 to be output in a following manner. First of all, the face image 1420 is further turned when the distance between the touch location and the viewing region is greater than a preset reference value d1 rather than when the distance between the touch location and the viewing region is equal to or smaller than the preset reference value d1 (FIG. 14 (a), FIG. 14 (b)).

As a user turns their face, if the distance between the touch location and the viewing region gets smaller gradually, the controller can control the face image 1420 to be output in a manner that the head is turned less. On the contrary, if the distance between the touch location and the viewing region gets greater gradually, the controller can control the face image 1420 to be output in a manner that the head is turned more.

The shapes of the indicators are non-limited by those shown in FIGS. 12 to 14. In addition, indicators of types different from those shown in the drawings can be output. If a touch is input to an outside of a viewing region, the controller of the glass device can output a feedback to indicate that the outside of the viewing region has been touched. Further, the type of the feedback output in response to the touch to the outside of the viewing region can be different from that of the feedback output in response to the touch to the inside of the viewing region.

For instance, when the inside of the viewing region is touched, at least one of a vibration of a first type, a first alarm sound and an illumination in a first color is output. When the outside of the viewing region is touched, at least one of a vibration of a second type, a second alarm sound and an illumination in a second color can be output. Hence, a user currently wearing the glass device can recognize whether the inside of the viewing region or the outside of the viewing region is touched in accordance with the type of the feedback.

The controller of the glass device can adjust a type of a display indicator in accordance with a type of a touch input received by the tablet device. For instance, FIG. 15 is a diagram illustrating one example of varying a type of a displayed indicator in response to a type of a touch input.

Figure 15:
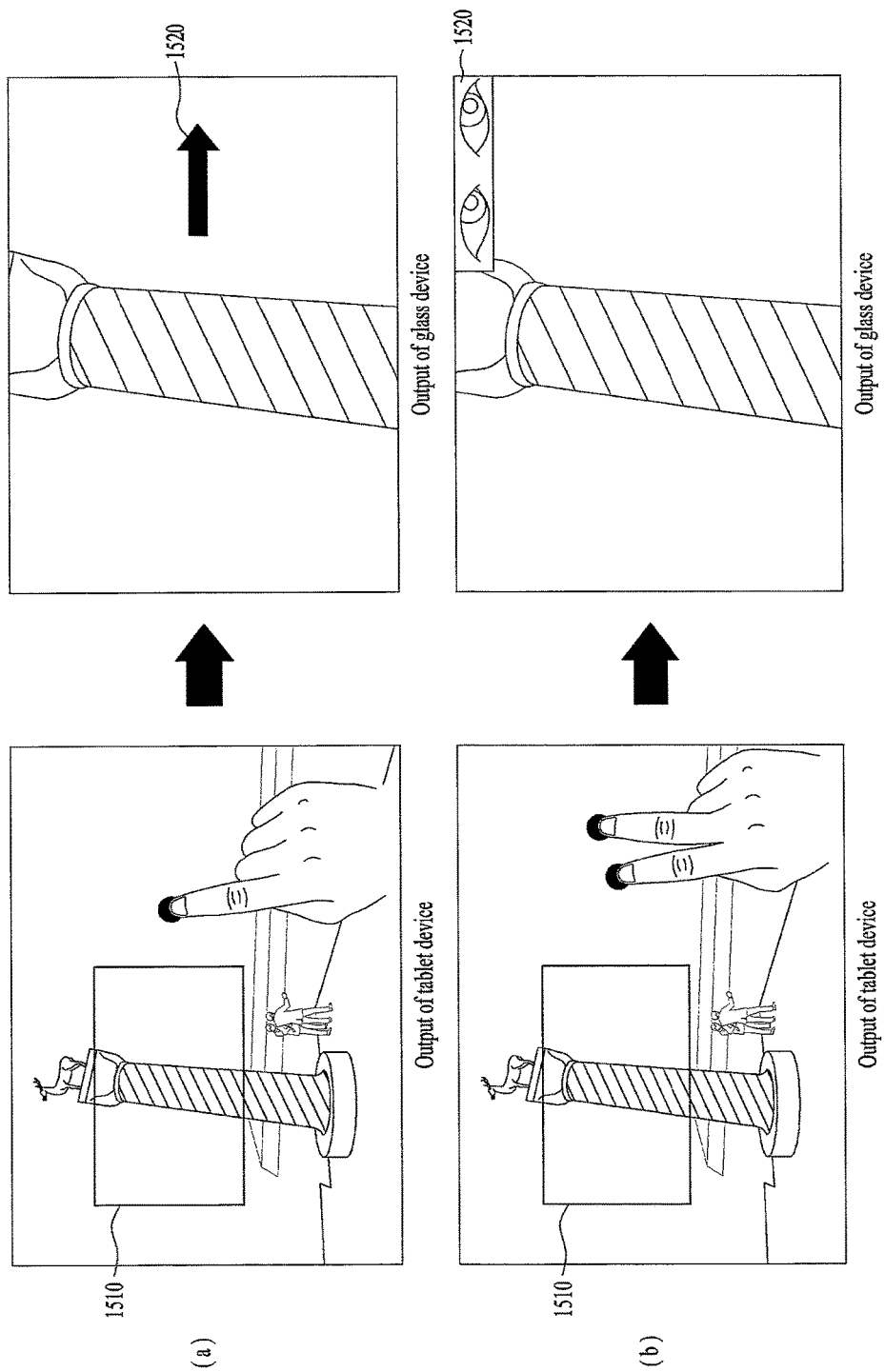
FIG. 15 is a diagram illustrating one example of varying a type of a displayed indicator in response to a type of a touch input.

Referring to FIG. 15, if a touch input of a first type for touching an outside of a viewing region 1510 is received through the tablet device, the controller of the glass device can control an indicator of a first type to be output. For instance, referring to FIG. 15 (a), as the tablet device receives a touch input of touching an outside of the viewing region 1510 with a single pointer, it can control an indicator 1520 in an arrow shape to be output through the glass device.

Further, if a touch input of a second type for touching an outside of a viewing region 1510 is received through the tablet device, the controller of the glass device can control an indicator of a second type to be output. For instance, referring to FIG. 15 (*b*), as the tablet device receives a touch input of touching an outside of the viewing region 1510 with two pointers, an indicator 1530 in an eyeball image shape is output through the glass device.

According to the examples shown in FIG. 15 (*a*) and FIG. 15 (*b*), the indicators have the shapes of the arrow and the eyeball image, respectively. Yet, as mentioned in the foregoing description, the shape of the indicator is non-limited by the shapes shown in the drawings. Moreover, according to the examples shown in FIG. 15 (*a*) and FIG. 15 (*b*), the touch input types are distinguished by the number of pointer(s) that touches the tablet device. Furthermore, the touch types can be distinguished by one of a touch time, a touch direction, a presence or non-presence of a direct touch (e.g., a proximity touch and a direct touch can be regarded as touch inputs of different types) and the like as well as by the number of pointers.

In another instance, the controller of the glass device can adjust a type of a displayed indicator depending on a distance between a location of a touch input and a viewing region. For instance, FIG. 16 is a diagram illustrating one example of varying a type of a displayed indicator in response to a location of a touch input.

Figure 16:
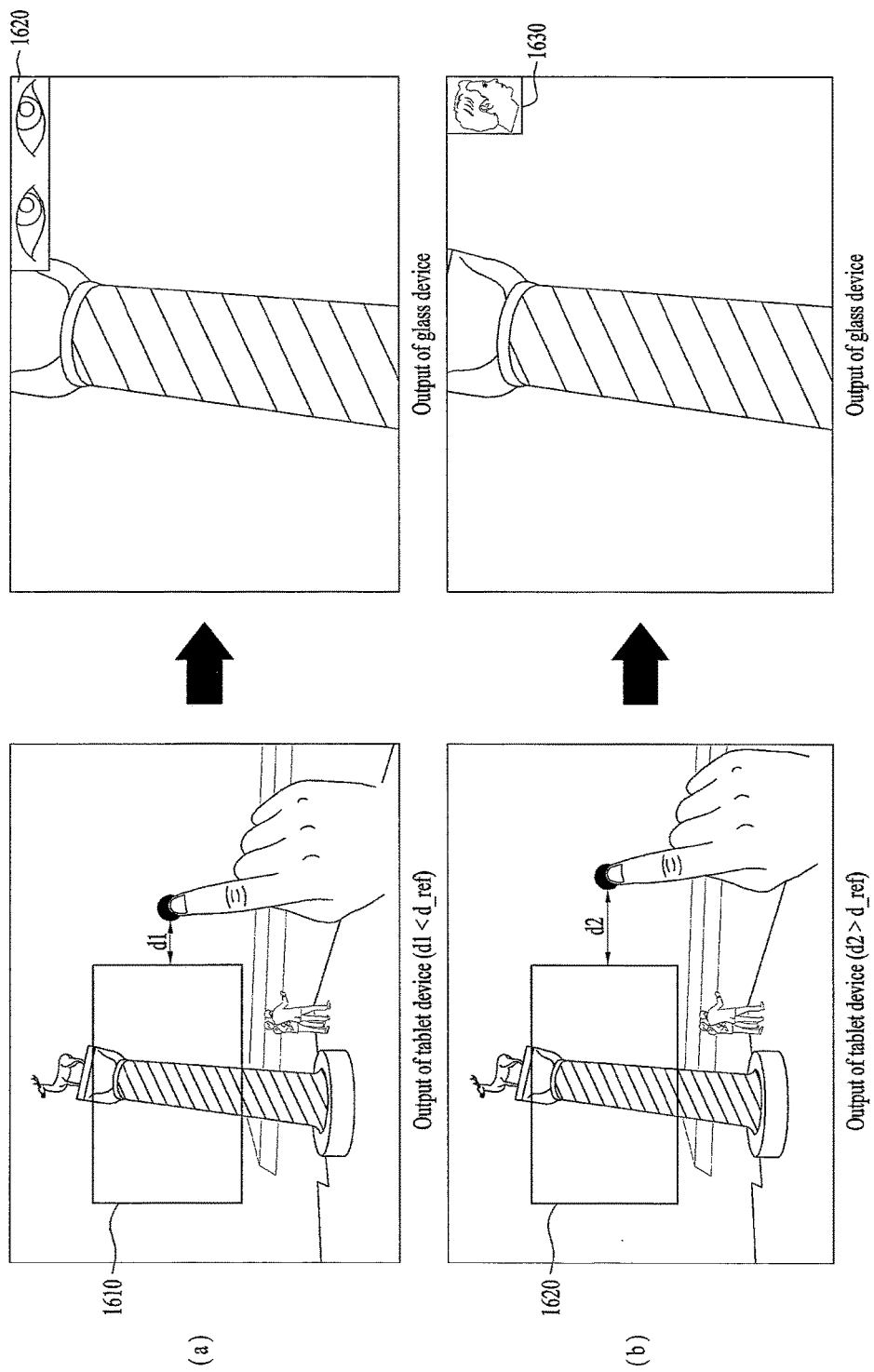
FIG. 16 is a diagram illustrating one example of varying a type of a displayed indicator in response to a location of a touch input.

Referring to FIG. 16, when a touch input of touching an outside of a viewing region 1610 is received through the tablet device, if a location of the touch input is located within a prescribed reference from the viewing region 1610, the controller 180 can control an indicator of a first type to be output. For instance, referring to FIG. 16 (*a*), as the location of the touch input received through the tablet device is located within the reference value d1 from the viewing region 1610, an eyeball image 1620 is output as an indicator through the display unit of the glass device. Thus, as the touch location is proximate to the viewing region 1610, if it is enough for a user to watch the touch location by moving pupils only without turning a head, as shown in the example in FIG. 16 (*a*), the controller of the glass device can output the eyeball image 1620 instead of a face image.

Further, when a touch input of touching an outside of the viewing region 1610 is received through the tablet device, if a location of the touch input is located out of the prescribed reference from the viewing region 1610, the controller 180 can control an indicator of a second type to be output. For instance, referring to FIG. 16 (ab, as the location of the touch input received through the tablet device is located out of the reference value d1 from the viewing region 1610, a face image 1630 is output as an indicator through the display unit of the glass device. Thus, as the touch location is proximate to the viewing region 1610, if it is difficult for a user to watch the touch location by moving pupils only, as shown in the example in FIG. 16 (*b*), the controller of the glass device can output the face image 1630 instead of the eyeball image.

As a user of the glass device changes their eyes or turns their head, if a location of a tablet device user's touch enters a viewing region, the controller of the glass device may stop outputting an indicator or output a new indicator indicating that the touch location has moved into the viewing region.

Figure 17:
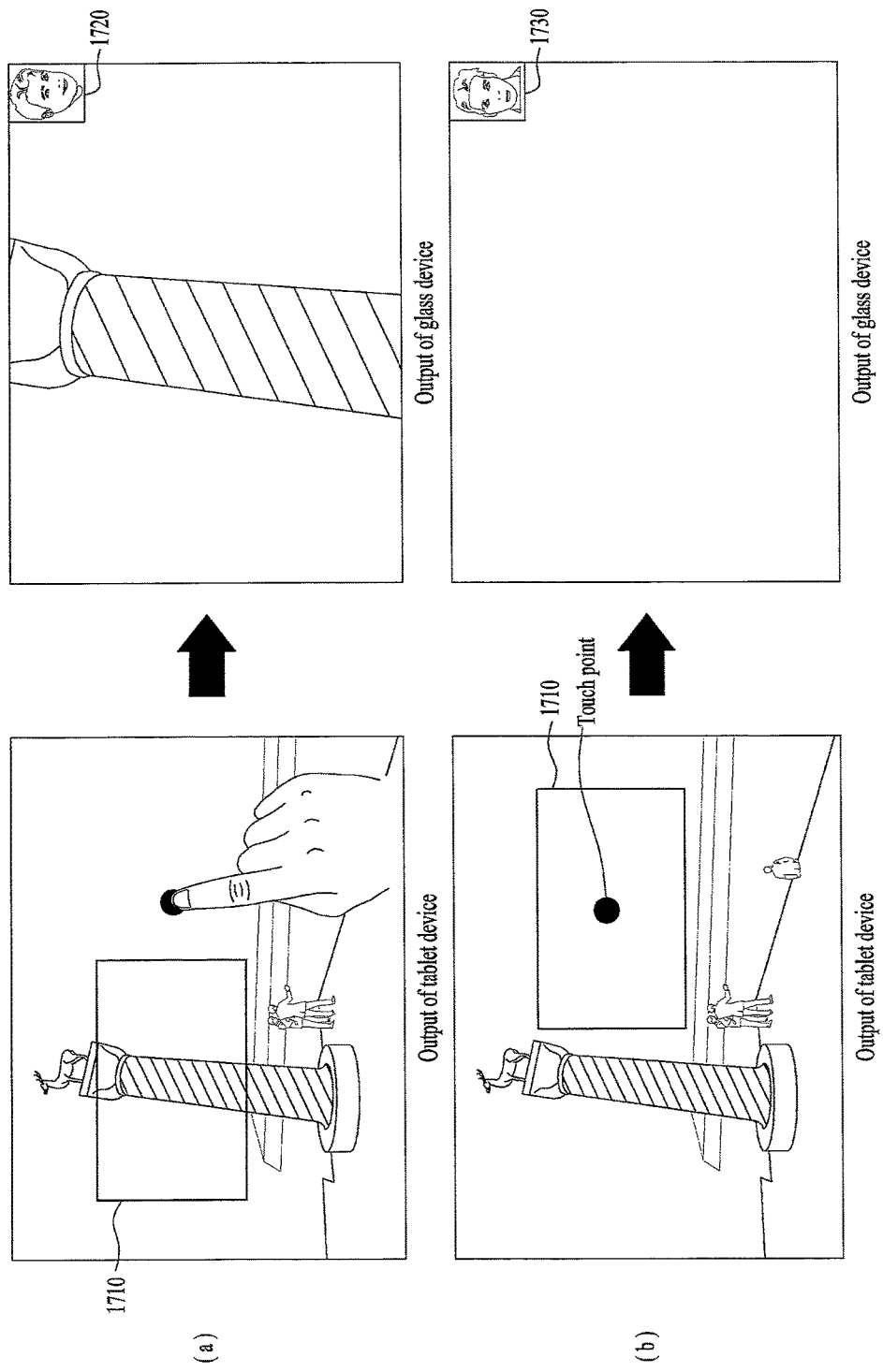
FIG. 17 is a diagram illustrating one example of outputting an indicator indicating that a touch location has entered an inside of a viewing region.

FIG. 17 is a diagram illustrating one example of outputting an indicator indicating that a touch location has entered an inside of a viewing region. Referring to FIG. 17 (*a*), when a touch input received by the tablet device is an outside of a viewing region 1710, the controller of the glass device can control an indicator, which indicates that the outside of the viewing region 1710 has been touched, to be output. According to the example shown in FIG. 17 (*a*), a face image 1720, in which a head is turned toward the touch location, is output as the indicator.

Thereafter, as the user currently wearing the glass device turns their head or changes their eyes, if the touch location enters the inside of the viewing region 1710, the controller of the glass device may stop outputting the indicator or output a new indicator indicating that the touch location has moved into the viewing region. For instance, referring to FIG. 17 (*b*), as the touch location enters the inside of the viewing region 1710, a face image 1730 for facing forward is output as an indicator.

The controller of the glass device can output such feedback as vibration, sound, illumination and/or the like together with the indicator. Through the indicator, the feedback and/or the like, a user currently wearing the glass device can be precisely aware of a location touched by a user of the tablet device.

When a user is watching a photographed image received from the glass device through the table device, the user can make a request for photographing an area failing to be captured by the glass device. For instance, when a user of the tablet device desires to check a space failing to be currently captured by the glass device, the user of the tablet device can request the glass device to capture a different space through a touch input.

If the touch input for requesting to capture the different space is received from the tablet device, a user of the glass device can control an indicator, which instructs the user to photograph a different area, to be output. For instance, FIG. 18 is a diagram illustrating one example of outputting an indicator instructing a user to photograph a different area.

Figure 18:
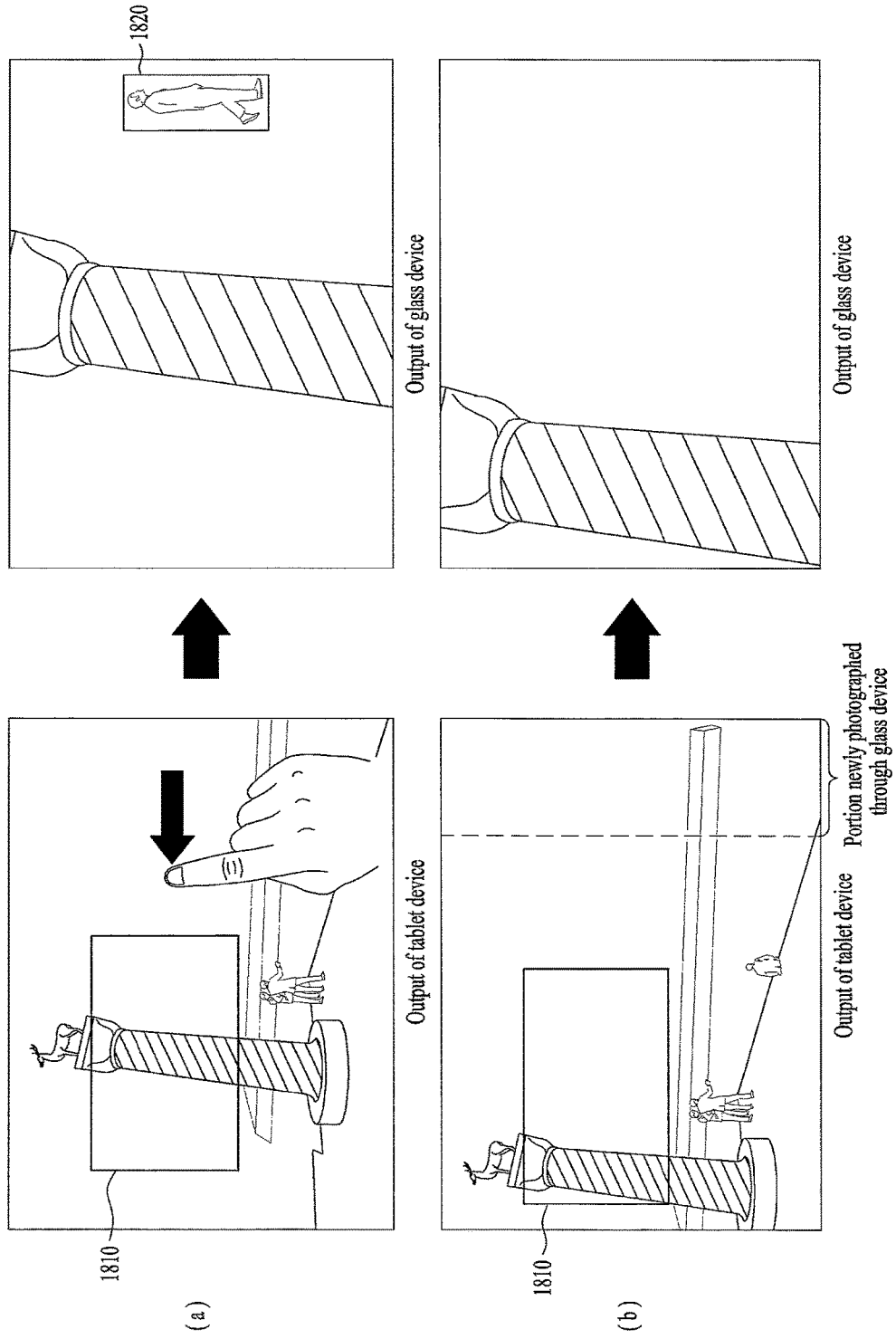
FIG. 18 is a diagram illustrating one example of outputting an indicator instructing a user to photograph a different area.

Referring to FIG. 18, when a user of the table device is watching a photographed image transmitted from the glass device, if the user of the tablet device applies a prescribed touch input through the tablet device, the controller of the glass device can control an indicator, which instructs to move away into another place from a currently photographed place, to be output. For instance, referring to FIG. 18 (*a*), if a touch input applied in a manner that a pointer currently touching an outside of a viewing region 1810 is dragged in a left direction is received through the tablet device, the controller of the glass device can output an image 1820, which instructs a user to move in a right direction, as an indicator through the display unit.

In particular, as shown in the example in FIG. 18 (*a*), if the tablet device receives a drag input in a prescribed direction, the controller of the glass device can control an indicator 1820, which instructs a user to move in a direction opposite to the pointer dragged direction, to be output. as shown in the example, the controller of the glass device can output an indicator instructing the user to move in the same direction in which the pointer has been dragged to move.

If the user currently wearing the glass device moves in the direction indicated by the indicator, the controller of the glass device can control the output of the indicator to be ended. For instance, referring to FIG. 18 (*b*), as the glass device can further capture a right environment, the output of the indicator is stopped. When the user currently wearing the glass device moves in a direction different from the direction indicated by the indicator, the indicator may be displayed continuously or by being emphasized (e.g., by being enlarged).

According to the embodiments mentioned in the foregoing description, on a photographed image output through the display unit of the glass device, an indicator indicating a location of a touch input received by the tablet device within a viewing region or an indicator indicating that a touch input of touching a viewing region outside has been received through the table device is output.

If the glass device has the same configuration as described with reference to FIG. 5, as mentioned in the foregoing description, the device can skip outputting the image photographed through the camera. In this instance, if a touch input of touching a viewing region inside is received through the tablet device, the controller of the glass device can project a graphic image to a region in a space corresponding to a touch location within a user's viewing range. If a touch input of touching a viewing region inside is received through the tablet device, the controller of the glass device can output an indicator indicating that the touch input of touching a viewing region outside within the user's viewing range has been received.

In particular, by projecting to display a graphic image to an external environment actually seen by a user, it can provide necessary information to the user currently wearing the glass device. When a touch input of touching an outside of a viewing region is received through the tablet device, the controller of the glass device can display an image corresponding to a prescribed region including a touch location in addition to an image corresponding to the viewing region.

Figure 19:
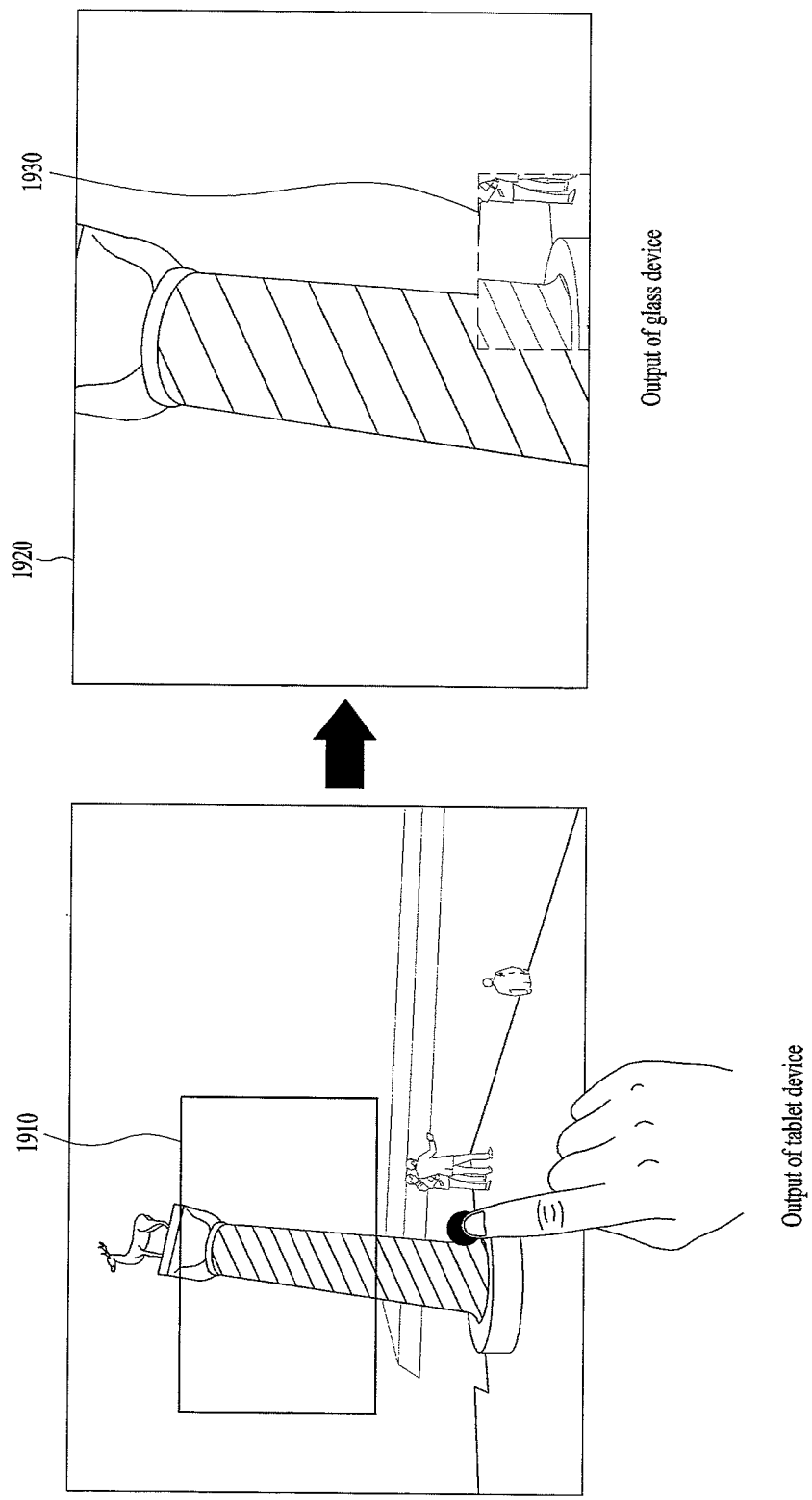
FIG. 19 is a diagram illustrating one example of displaying an image corresponding to a prescribed area including a touch location.

For instance, FIG. 19 is a diagram illustrating one example of displaying an image corresponding to a prescribed area including a touch location. Referring to FIG. 19, when a user input of touching an outside of a viewing region 1910 is received through the tablet device, the controller of the glass device can output an image corresponding to a prescribed region including a touch location to the display unit.

For instance, referring to FIG. 19 (*a*), while an image corresponding to the viewing region 1910 is output through the display unit of the glass device, if a touch input of touching an outside of the viewing region 1910 is received through the tablet device, the controller of the glass device can control an image 1930 corresponding to a prescribed region including a touched location to be additionally output through the display unit. According to the example shown in FIG. 19 (*b*), the image 1930 corresponding to the prescribed region is output by overlaying the image 1920 corresponding to the viewing region 1910.

An output location of the image 1930 corresponding to the prescribed region can be adjusted in accordance with the touch location. For instance, referring to FIG. 19 (*a*) and FIG. 19 (*b*), if a bottom part of the outside of the viewing region 1910 is touched, the image 1930 corresponding to the prescribed region may be located at a right part of the display unit. Further, when left or right portion of the outside of the viewing region 1910 is touched, the image 1930 corresponding to the prescribed region may be located at the left or right part of the display unit.

As a user of the glass device changes their eyes or turns their head, if a location of a tablet device user's touch enters an inside of the viewing region 1910, the controller of the glass device may stop outputting the partial image 1930. Moreover, the controller of the glass device may output such feedback as vibration, sound, illumination and/or the like.

According to the embodiments mentioned in the foregoing description, the glass device outputs a photographed image through the display unit as soon as it sends the photographed image to the tablet device. If the glass device receives a prescribed user input while outputting an image photographed through the camera, the glass device receives a photographed image captured by the tablet device from the tablet device and can then output the received photographed image.

Figure 20:
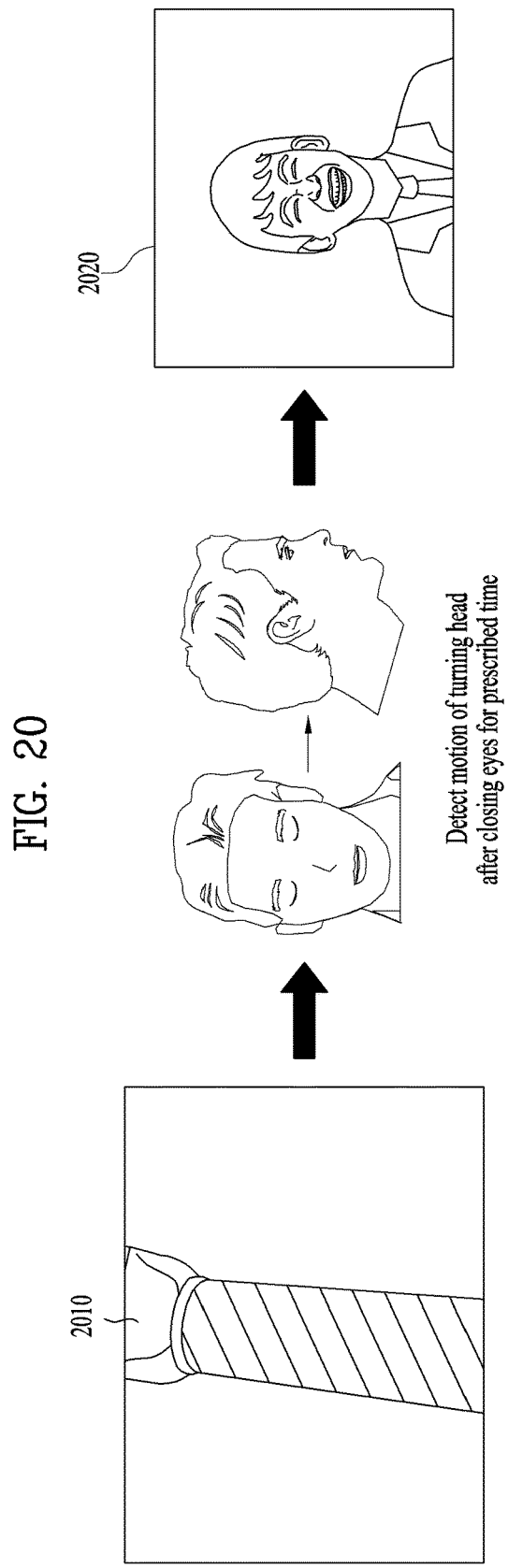
FIG. 20 is a diagram illustrating one example of outputting a photographed image captured by a tablet device through a glass device.

For instance, FIG. 20 is a diagram illustrating one example of outputting a photographed image captured by a tablet device through a glass device. Referring to FIG. 20, while a portion 2010 of a photographed image captured by the camera of the glass device is output through the display unit of the glass device, if a prescribed user input is received, the controller of the glass device can control a photographed image 2020 captured by the tablet device to be output through the display unit of the glass device.

For instance, as shown in the example in FIG. 20, if a user currently wearing the glass device makes a gesture of turning their head while closing their eyes, the controller of the glass device can output the image 2020 captured by the tablet device on the display unit.

According to the example shown in FIG. 20, a preset user input includes a gesture of a user turning their head by closing their eyes for a prescribed time. In addition to the example shown in the drawing, the preset user input may include one of a gesture input of a different type, an input of manipulating the glass device in direct, and the like.

After the glass device has set the coordinates of a region for displaying the photographed image captured by the tablet device, the glass device can determine whether to output the image captured by the tablet device or the image captured by the glass device depending on whether the region indicated by the set coordinates is included in a viewing region.

Figure 21:
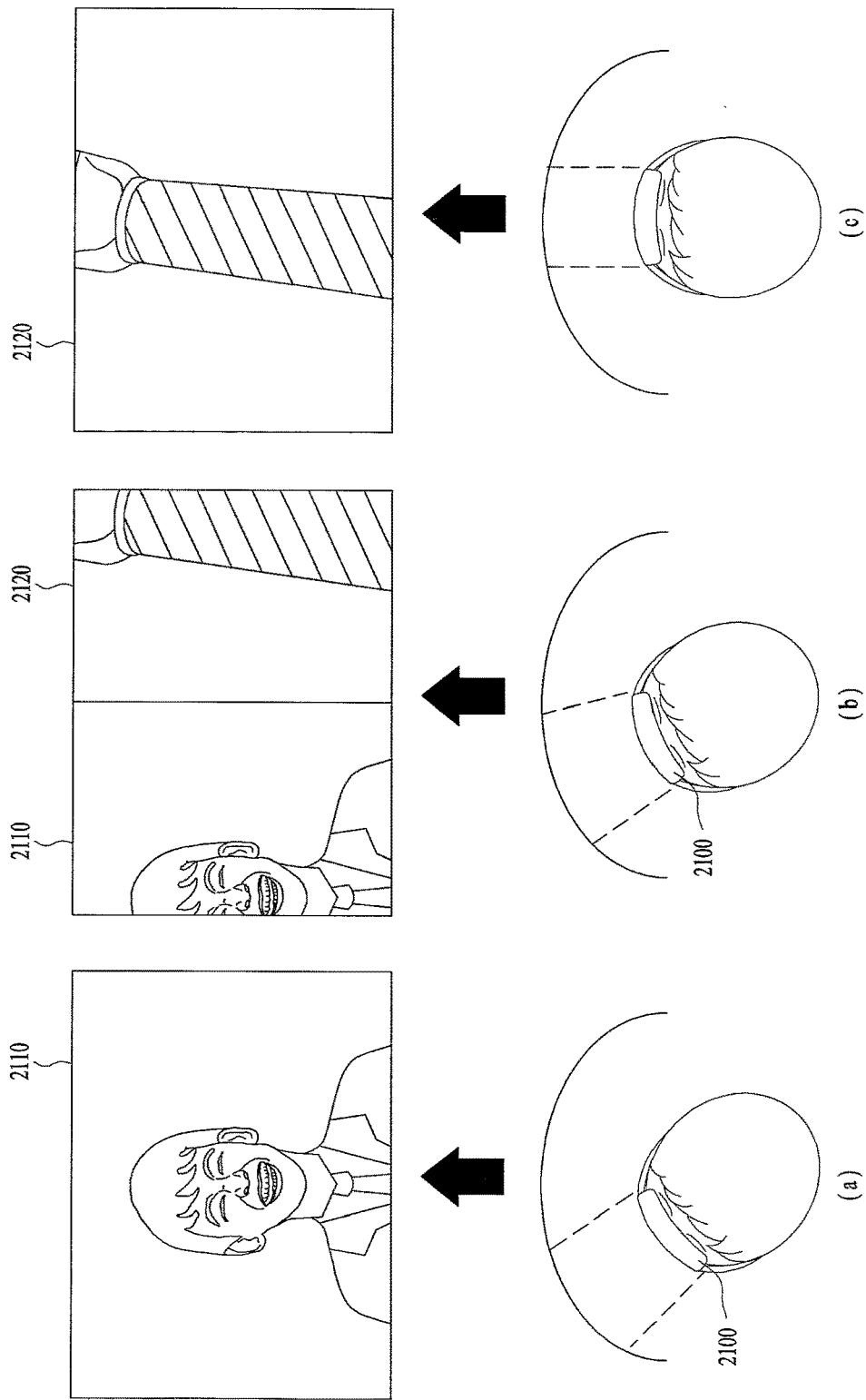
FIG. 21 is a diagram to describe an output example of a glass device.

For instance, FIG. 21 is a diagram to describe an output example of a glass device. Referring to FIG. 21, the controller of the glass device can set the coordinates to which a photographed image captured by the tablet device will be output. Further, based on a user input for outputting the photographed image captured by the tablet device, the glass device can set the coordinates for outputting the photographed image captured by the tablet device. For instance, as shown in the example in FIG. 21, if a gesture of the user turning their head after closing their eyes for a prescribed time is detected from the user currently wearing the glass device, the controller of the glass device can set the coordinates for outputting the photographed image captured by the tablet device based on the coordinates of the glass device after the detection of the gesture.

For instance, based on a rotation angle for x-axis direction of the glass device, a rotation angle for y-axis direction, a distance to x-axis, a distance to y-axis, a distance to z-axis and the like, the glass device can set the coordinates for outputting the photographed image captured by the tablet device. If a region indicated by the set coordinates is entirely included inside a viewing region, as shown in the example in FIG. 21 (*a*), the controller of the glass device 2100 can control the photographed image 2110 captured by the tablet device to be output through the display unit.

As the user currently wearing the glass device 2100 moves their pupils or turns their head, if a portion of the region indicated by the set coordinates is moved away from the viewing region, as shown in the example in FIG. 21 (*b*), the controller of the glass device 2100 can output a portion of the photographed image 2110 captured by the tablet device and can also control a photographed image 2120, which is captured by the glass device 2100, to be displayed through a remaining region.

If the region indicated by the set coordinates completely moves away from the viewing region, as shown in the example in FIG. 21 (*c*), the controller of the glass device 2100 stops the output of the photographed image captured by the tablet device and can also control the photographed image, which is captured by the glass device 2100, to be output.

If the user currently wearing the glass device 2100 re-inputs a gesture of turning their head after closing their eyes for a prescribed time, the controller of the glass device 2100 can newly set the coordinates for outputting the photographed image captured by the tablet device after the input of the gesture based on new coordinates of the glass device 2100.

According to the descriptions with reference to FIGS. 19 to 21, an image corresponding to a touch location received through the tablet device, a photographed image received from the tablet device or the like can be output through the display unit of the glass device. If a mobile terminal of the glass device has the configuration described with reference to FIG. 5, the controller of the glass device can output an image of a portion corresponding to a touch location or a photographed image received through the tablet device to a space instead of outputting an image of a portion corresponding to a touch location or a photographed image received through the tablet device to the display unit.

When an object existing outside a viewing region is touched through the tablet device, the glass device captures the touched object and can then set the coordinates for outputting the captured image. Thereafter, if a region indicated by the set coordinates is included in an inside of the viewing region, the controller of the glass device can control the captured image to be displayed by overlaying the photographed image.

Figure 22:
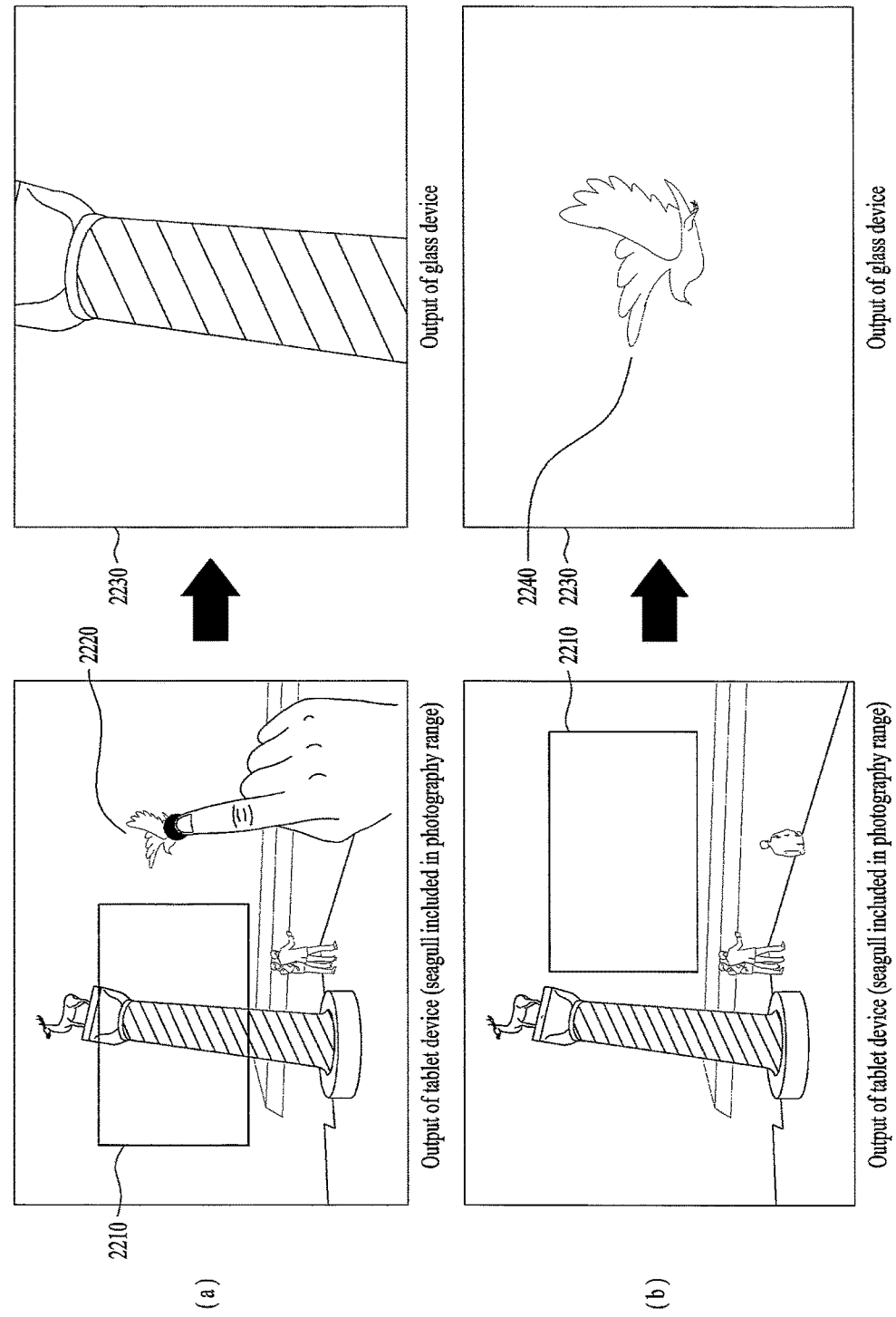
FIG. 22 is a diagram illustrating one example of outputting a captured image by overlaying a photographed image.

For instance, FIG. 22 is a diagram illustrating one example of outputting a captured image by overlaying a photographed image. Referring to FIG. 22, if a touch input touching an object 2220 outside a viewing region 2210 is received through the tablet device, the controller of the glass device creates a captured image by capturing the selected object 2220 and can then set the coordinates for outputting the captured image. Further, the controller of the glass device can set the coordinates for displaying the captured image based on a location at which the object 2220 was displayed in a photographed image at that time of the capturing.

For instance, referring to FIG. 22 (*a*), a touch input touching a seagull 2220 located outside the viewing region 2210 is received through the tablet device. In response to a user input received through the tablet device, the controller of the glass device can create a captured image of capturing the seagull 2220. In this instance, an output location of the captured image can be set based on a location of the seagull on a photographed image.

For instance, as a user currently wearing the glass device moves their pupils or turns their head, if the region for outputting the captured image is included inside of the viewing region 2210, referring to FIG. 22 (*b*), the controller of the glass device can control the captured image 2240 to be output by overlaying the photographed image 2230.

Only if the object 2220 previously set for a capture target fails to exist in the photographed image, the controller of the glass device outputs the captured image. Only if the object 2220 previously set for a capture target exists in the photographed image, the controller of the glass device can skip the output of the captured image. In particular, if the object 2220 previously set for a capture target exists in the photographed image, since the object 2220 can be watched in real time, it may be unnecessary to output the captured image. If the mobile terminal of the glass device has the configuration described with reference to FIG. 5, the controller of the glass device can project the captured image into a space instead of outputting the captured image through the display unit.

According to the former description with reference to FIG. 8, the tablet device displays the photographed image received from the glass device. In addition, the viewing region is identifiably displayed on the displayed photographed image. The controller of the glass device can output a synthetic image created from synthesizing images designated as the user's viewing region in the photographed image instead of outputting the photographed image.

Figure 23:
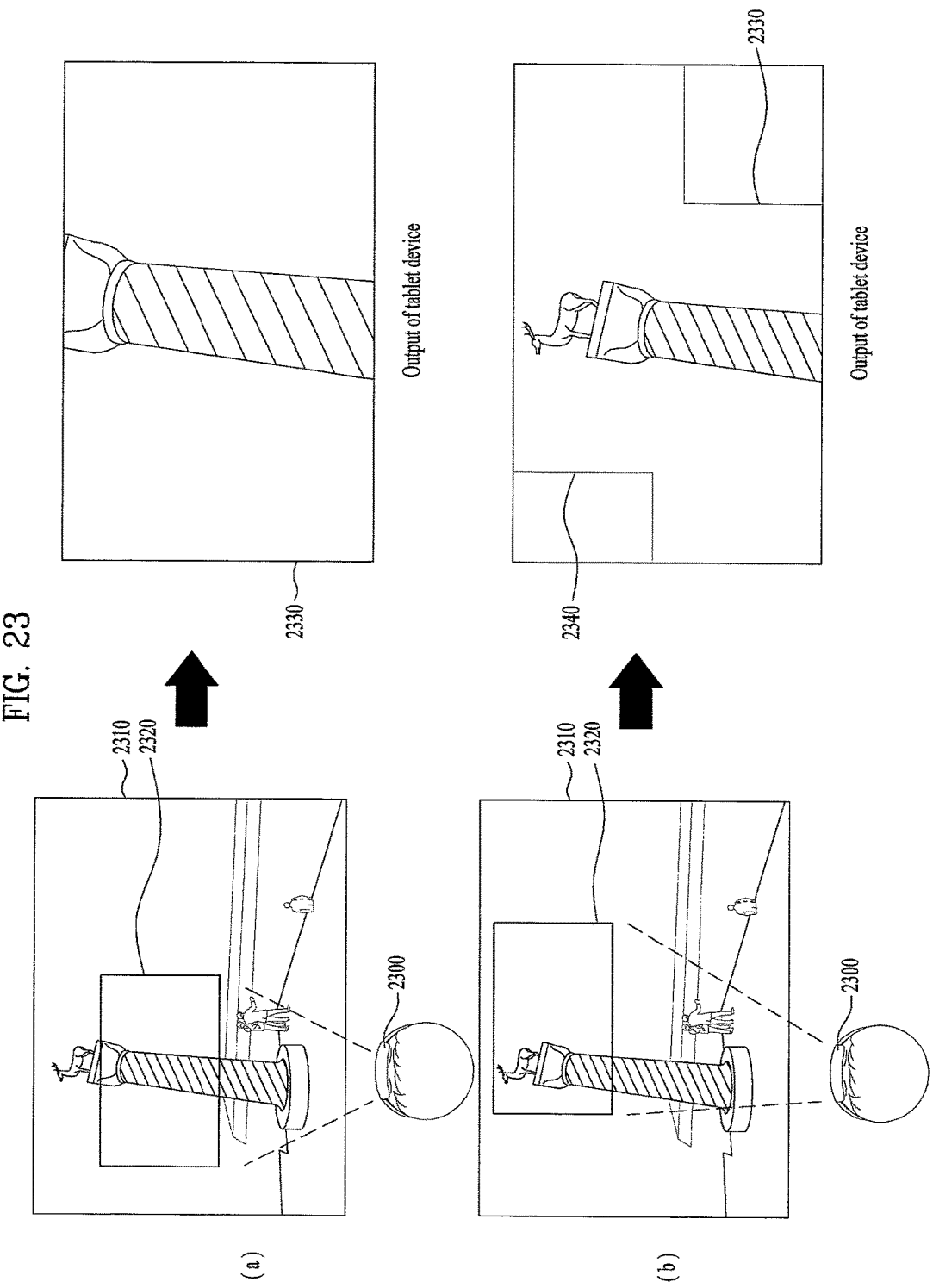
FIG. 23 is a diagram illustrating one example of outputting a synthetic image through a tablet device.

For instance, FIG. 23 is a diagram illustrating one example of outputting a synthetic image through a tablet device. Referring to FIG. 23 (*a*), the tablet device can output an image 2330 corresponding to a viewing region in a photographed image received from the glass device 2300. Thereafter, as a user currently wearing the glass device 2300 moves their pupils or turns their head, if a new space region is included in the viewing region 2320, referring to FIG. 23 (*b*), the controller of the tablet device can control a synthetic image, which is created from synthesizing the displayed image 2330 with an image 2340 in the space region newly included in the viewing region, to be output.

Hence, through the display unit of the tablet device, an image in a region having a history of being included in the user's viewing region once at least in an image 2310 captured by the glass device 2300 can be output only. The tablet device displays at least one portion of a photographed image captured by the glass device and can also control an image for a prescribed space to be fixedly output irrespective of a motion of the glass device.

Figure 24:
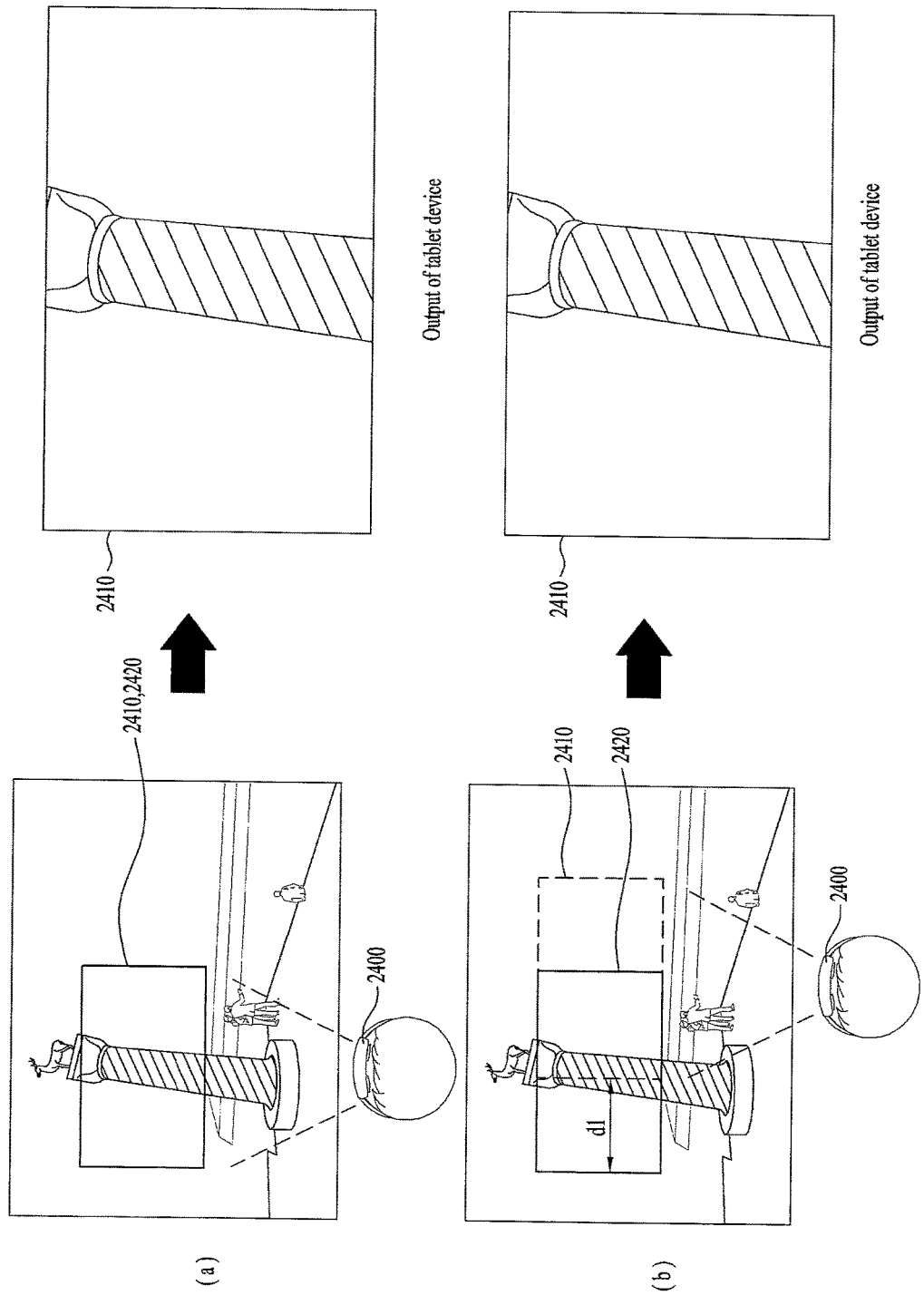
FIG. 24 is a diagram illustrating one example of fixedly outputting an image corresponding to a prescribed space in a photographed image.

For instance, FIG. 24 is a diagram illustrating one example of fixedly outputting an image corresponding to a prescribed space in a photographed image. Referring to FIG. 24, the controller of the tablet device can output a portion of a photographed image captured by the glass device 2300 through the display unit. According to the example shown in FIG. 24 (*a*), an image 2420 corresponding to a viewing region 2410 is output through the display unit.

While at least one portion of the photographed image is output, if a user input for requesting fixation is received, the controller of the tablet device can control an image, which corresponds to a prescribed space, to be fixedly output irrespective of the motion of the glass device 2400. For instance, while a first region in a photographed image is output through the tablet device, if a user input for requesting fixation of an image is received, the controller of the tablet device can shift a displayable region 2420 in a direction opposite to the motion of the glass device 2400 (or in a direction opposite to a shift of the viewing region). According to the example shown in FIG. 24 (*b*), as the viewing region 2410 is shifted on x-axis by d1 due to a movement of a user currently wearing the glass device 2400, the displayable region 2420 is spaced apart from the viewing region 2410 by '−d1' on the x-axis.

Like the examples shown in FIG. 24 (*a*) and FIG. 24 (*b*), as the displayable region is moved in the direction opposite to the moving direction of the glass device, a region in a prescribed space can be simultaneously output through the tablet device. As a moving distance of the glass device is considerably long, if the camera of the glass device is unable to further capture a prescribed space set to be fixedly output, the controller of the tablet device may output a captured image for the prescribed space.

According to the example shown in FIG. 24, the tablet device receives a user input for fixedly outputting an image for a prescribed space is received through the tablet device. Moreover, a user input for fixedly outputting an image for a prescribed space may be received through the glass device as well. When a user input for fixedly outputting an image for a prescribed space is received through the glass device, the table device can fixedly output the image for the prescribed space irrespective of the motion of the glass device.

Figure 25:
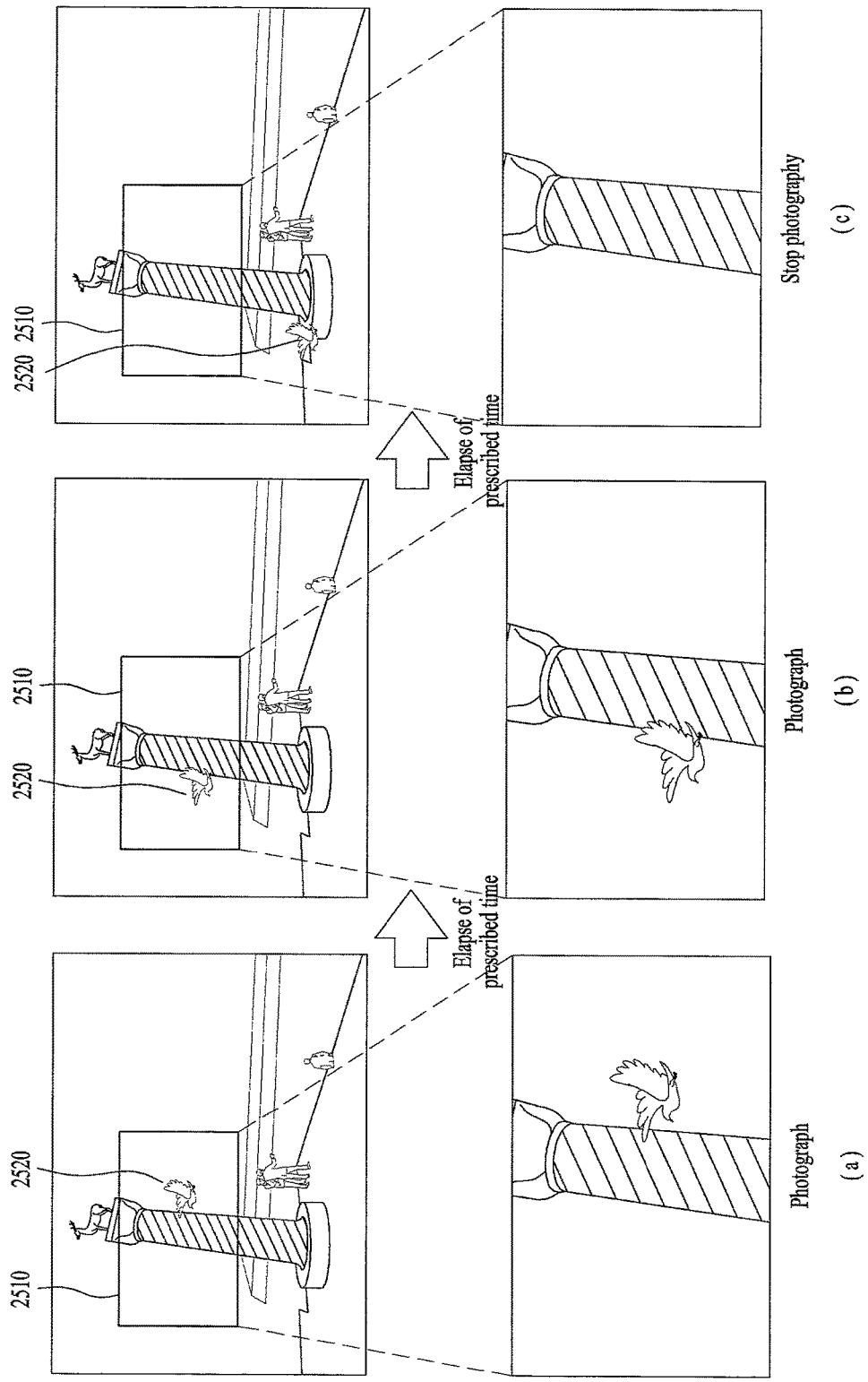
FIG. 25 is a diagram illustrating one example of starting a photography of a glass device in response to a user input received through a tablet device.

If a user input of touching an object in a viewing region is received through the tablet device, the controller of the glass device can control the camera to capture a photo. For instance, FIG. 25 is a diagram illustrating one example of starting a photography of a glass device in response to a user input received through a tablet device. Referring to FIG. 25, if a user input of touching a specific object in a viewing region 2510 is received, the controller of the glass device can take a photo through the camera. For example, referring to FIG. 25 (*a*), if a user input of touching a seagull 2520 within a viewing region 2510 is received through the tablet device, the controller of the glass device can take a photo through the camera.

Further, the glass device can perform burst shooting (i.e., consecutively take photos) in a prescribed time interval until the object 2520 selected by the tablet device gets away from the viewing region 2510 to disappear. For instance, referring to FIG. 25 (*b*), if the object 2520 still remains within the viewing region 2510 after the elapse of a prescribed time, the controller of the glass device can control photos to be taken through the camera.

Referring to FIG. 25 (*c*), after the elapse of a prescribed time, if the object 2520 gets away from the viewing region 2510, the controller of the glass device can control the burst shooting to be stopped. After the object has gotten away from the viewing region, if the object re-enters the viewing region, the controller of the glass device can take a photo again through the camera.

Figure 26:
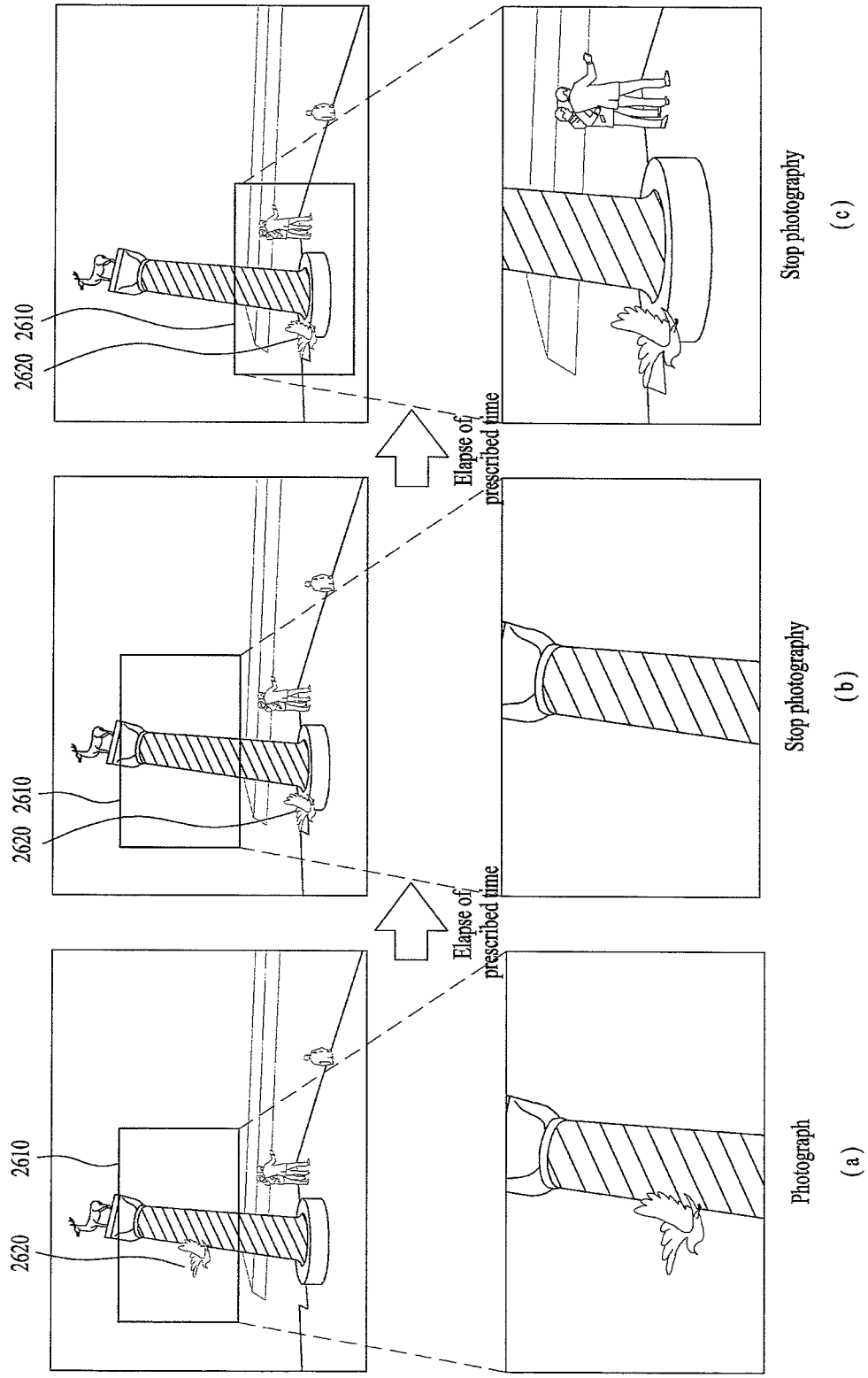
FIG. 26 is a diagram illustrating one example of restarting photography if an object re-enters a viewing region.

For instance, FIG. 26 is a diagram illustrating one example of restarting photography if an object re-enters a viewing region. Referring to FIG. 26 (*a*), if a user input of selecting a specific object 2620 in a viewing region 2610 is received through the tablet device, the controller of the glass device can take a photo through the camera.

Thereafter, referring to FIG. 26 (*b*), if the object 2620 gets away from the viewing region 2610, the controller of the glass device can control the photography through the camera to be paused. After a while, if the object 2620 re-enters the viewing region 2610, referring to FIG. 26 (*c*), the controller of the glass device can control the photography through the camera to be resumed. The glass device can send the photographed photo(s) to the tablet device. The tablet device can then display the received photo(s).

According to the examples described with reference to FIG. 25 and FIG. 26, if the tablet device receives a user input of selecting an object located within a viewing region, the glass device can takes a photo. Unlike the examples shown in the drawings, the glass device may take a photo in response to a user input applied through the glass device as well.

If a user input of selecting an object located outside a viewing region is received through the tablet device, the glass device may take a photo only after the selected object has entered the viewing region. The glass device can send audio data input through the microphone to the tablet device together with a photographed image. Further, the controller of the tablet device amplifies the sound generated from a viewing region in the photographed image but suppresses the sound generated from the rest of the region in the photographed image, thereby emphatically outputting the sound generated from the viewing region.

Figure 27:
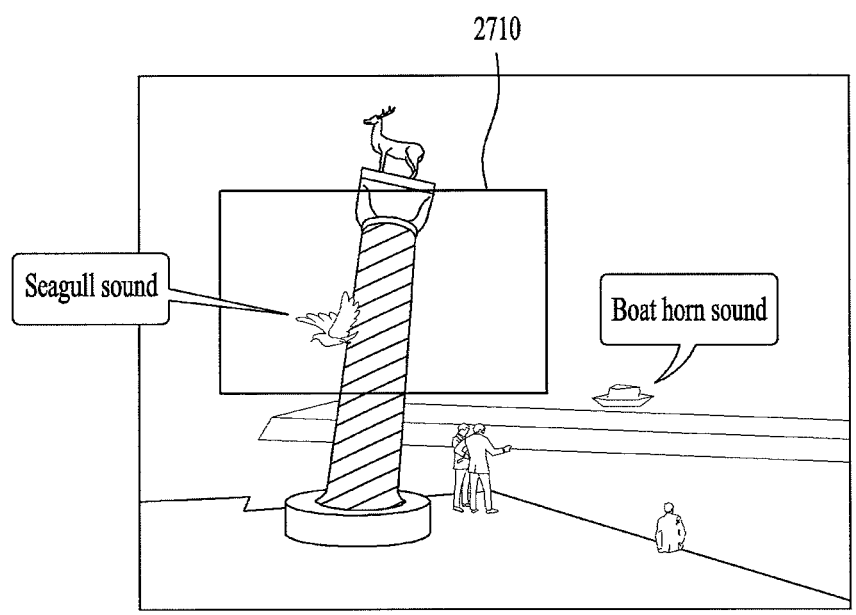
FIG. 27 is a diagram illustrating one example of performing a sound zooming.

For instance, FIG. 27 is a diagram illustrating one example of performing a sound zooming. For clarity of the following description, assume that the tablet device receives audio data including a boat horn and a seagull sound together with a photographed image from the glass device. Referring to FIG. 27, the controller of the tablet device can output the photographed image and the audio data received from the glass device. Further, if a user input of touching an inside of a viewing region 2710 is received, the controller of the glass device can output the audio data by amplifying the sound generated from the viewing region 2710 but suppressing the sound generated from an outside of the viewing region 2710. As shown in the example in FIG. 27, if a touch input of touching an inside of the viewing region 2710 including a seagull is received through the tablet device, the controller of the tablet device can control the audio data to be output by suppressing the boat horn but amplifying the seagull sound.

Accordingly, embodiments of the present invention provide various effects and/or features. First of all, according to at least one of embodiments of the present invention, the present invention provides a mobile terminal and controlling method thereof, by which user's convenience can be enhanced. In particular, the present invention provides a mobile terminal and controlling method thereof, by which a photographed image can be shared with other terminals. In addition, the present invention provides a mobile terminal and controlling method thereof, by which if a prescribed point on a photographed image is selected by another terminal, the selected point can be indicated.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A glasses type mobile terminal, comprising:
a display configured to output information;
a camera;
a wireless communication processor configured to wirelessly communicate with an external terminal; and
a controller configured to:
transmit a first image received by the camera to the external terminal via the wireless communication processor, wherein the first image includes a viewing region of the glasses type mobile terminal,
receive a first touch information from the external terminal, wherein the first touch information indicates a touch input of the first image displayed on the external terminal is touched outside of the viewing region,
display an indicator via the display indicating the touch input of the first image displayed on the external terminal is touched outside of the viewing region of the glasses type mobile terminal, receive a second touch information from the external terminal, wherein the second touch information indicates a touch input touches an object, determine whether or not the object exists in the viewing region in the first image, control the camera to consecutively take a picture in a prescribed time interval until the object disappears from the viewing region, and control the camera to resume consecutively taking a picture in the prescribed time interval if the object that disappeared re-enters the viewing area.

2. The glasses type mobile terminal of claim 1, wherein the controller is further configured to adjust a size of the displayed indicator depending on a distance between the viewing region and a touched location of the touch input.

3. The glasses type mobile terminal of claim 1, wherein the controller is further configured to:

adjust the viewing region to follow a gaze of the user, and stop displaying the indicator when the adjusted viewing region includes a location corresponding to the touch input.

4. The glasses type mobile terminal of claim 1, wherein the controller is further configured to display an image of a prescribed region of the first image including a location of the touch input in the first image on the display.

5. The glasses type mobile terminal of claim 1, wherein the controller is further configured to display a second image received from the external terminal on the display.

6. The glasses type mobile terminal of claim 1, wherein the controller is further configured to:

set coordinates of the glasses type mobile terminal for displaying a second image received by the external terminal, and display at least a portion of the second image on the display when the glasses type mobile terminal is within the set coordinates.

7. The glasses type mobile terminal of claim 1, wherein if the second touch information indicates the touch input touches an object located outside of the viewing region in the first image, the controller is further configured to capture an image of the object when the viewing region is changed and includes a location corresponding to the touched object.

8. The glasses type mobile terminal of claim 1, wherein the indicator comprises at least one of an arrow shape pointing toward a location of the touch input from the viewing region, an eyeball image having eyes facing the location of the touch input, or a face image facing toward the location of the touch input.

9. The glasses type mobile terminal of claim 1, wherein the controller is further configured to output a feedback of a first type together with the indicator.

10. The glasses type mobile terminal of claim 9, wherein if a touched location caused by the touch input is entered to an inside of the viewing region, the controller is further configured to output a feedback of a second type in response to the touch information indicating the touch input touches inside the corresponding viewing region in the first image.

11. The glasses type mobile terminal of claim 1, wherein the display comprises a head mounted display.

12. The glasses type mobile terminal of claim 1, wherein the display comprises a projector configured to project a graphic image in a direction of a user's eyes.

13. The glasses type mobile terminal of claim 1, wherein the indicator is a face image of a user's face, and wherein the controller is further configured to control a direction faced by the face image to be set toward to the touch location.

14. A mobile terminal, comprising:

a wireless communication processor configured to receive an image from a glasses type mobile terminal;

a display; and a controller configured to:

display the image received from the glasses type mobile terminal on the display, wherein a portion of the image corresponds to a viewing region of the glasses type mobile terminal is visually indicated within the image, receive a touch input of the image, transmit touch information to the glasses type mobile terminal indicating a location of the touch input of the image, wherein the touch information indicates the location of the touch input is outside of the viewing region of the glasses type mobile terminal, output a face image of a user's face on the displayed image, and control a direction faced by the face image to be set toward the location of the touch input.

15. A method of controlling a glasses type mobile terminal, the method comprising:

transmitting, via a wireless communication processor, a first image received by a camera of the glasses type mobile terminal to an external terminal, wherein the first image includes a viewing region of the glasses type mobile terminal;

receiving, via a controller of the glasses type mobile terminal, a first touch information from the external terminal, wherein the first touch information indicates a touch input of the first image displayed on the external terminal is touched outside of the viewing region of the glasses type mobile terminal;

displaying, via an display of the glasses type mobile terminal, an indicator indicating the touch input of the first image displayed on the external terminal which is touched outside of the viewing region of the glasses type mobile terminal, receiving, via the controller of the glasses type mobile terminal, a second touch information from the external terminal, wherein the second touch information indicates a touch input touches an object;

determining, via the controller of the glasses type mobile terminal, whether or not the object exists in the viewing region in the first image;

controlling, via the camera of the glasses type mobile terminal, to consecutively take a picture in a prescribed time interval until the object disappears from the viewing region; and controlling, via the camera of the glasses type mobile terminal, to resume consecutively taking a picture in the prescribed time interval if the object that disappeared re-enters the viewing area.

16. The method of claim 15, further comprising:

adjusting a size of the displayed indicator depending on a distance between the viewing region and a touched location of the touch input.

17. The method of claim 15, wherein the indicator is a face image of a user's face, and wherein the method further comprises controlling a direction faced by the face image to be set toward to the touch location.

* * * * *